United States Patent
Ono et al.

(10) Patent No.: US 7,371,480 B2
(45) Date of Patent: May 13, 2008

(54) SILICA SOL COMPOSITION, MEMBRANE ELECTRODE ASSEMBLY WITH PROTON-EXCHANGE MEMBRANE, AND FUEL CELL

(75) Inventors: Michio Ono, Minami-ashigara (JP); Koji Wariishi, Minami-ashigara (JP); Kimiatsu Nomura, Minami-ashigara (JP); Wataru Kikuchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 593 days.

(21) Appl. No.: 10/807,689

(22) Filed: Mar. 24, 2004

(65) Prior Publication Data

US 2004/0241522 A1    Dec. 2, 2004

(30) Foreign Application Priority Data

| Mar. 25, 2003 | (JP) | ............................. 2003-082369 |
| Mar. 25, 2003 | (JP) | ............................. 2003-082370 |
| Dec. 26, 2003 | (JP) | ............................. 2003-432663 |

(51) Int. Cl.
*H01M 8/10* (2006.01)
*C08G 77/00* (2006.01)
*C01F 7/08* (2006.01)
*C08J 5/22* (2006.01)

(52) U.S. Cl. ........................... 429/33; 429/46; 429/313; 521/25

(58) Field of Classification Search .................. 429/34, 429/33, 46, 313; 521/25
See application file for complete search history.

(56) References Cited

U.S. PATENT DOCUMENTS

2004/0062970 A1 * 4/2004 Nomura et al. ................ 429/33

FOREIGN PATENT DOCUMENTS

| JP | 2000-090946 | 3/2000 |
| WO | WO 03/041091 A1 | 5/2003 |

OTHER PUBLICATIONS

*Inorganic-organic proton conductors based on alkylsulfone functionalities and their patterning by photoinduced methods*, Laurent Depre, Jürgen Kappel and Michal Popall, Electrochimica Acta., vol. 43, Nos. 10-11, pp. 1301-1306, 1998.

* cited by examiner

*Primary Examiner*—Gregg Cantelmo
(74) *Attorney, Agent, or Firm*—Sughrue Mion, PLLC

(57) ABSTRACT

Provided are a proton-exchange membrane of which the ionic conductivity is high and the methanol crossover is low, and a fuel cell of high power that comprises the proton-exchange membrane. The proton-exchange membrane has a structure of mesogen-containing organic molecular chains and a proton-donating group-containing group covalent-bonding to a silicon-oxygen three-dimensional crosslinked matrix, in which at least a part of the organic molecular chains are oriented to form an aggregate thereof; and the fuel cell comprises the membrane.

9 Claims, 3 Drawing Sheets a) Current-Voltage Curve of C-5 b) Current-Voltage Curve of C-4

US 7,371,480 B2

SILICA SOL COMPOSITION, MEMBRANE ELECTRODE ASSEMBLY WITH PROTON-EXCHANGE MEMBRANE, AND FUEL CELL

This application claims priority to Japanese Application No. 082369/2003 filed Mar. 25, 2003, Japanese Application No. 082370/2003 filed Mar. 25, 2003, and Japanese Application No. 432663/2003 filed Dec. 26, 2003, the entire contents of which are incorporated herein by reference.

BACKGROUND OF THE INVENTION

1. Field of the Invention

The present invention relates to a silica sol composition, to a membrane electrode assembly with a proton-exchange membrane, and to a fuel cell comprising the assembly.

2. Description of the Background

These days it is expected that solid polymer fuel cells will be put into practical use for, for example, power sources for household use and power sources to be mounted on vehicles as clean power-generating devices that are ecological to the global environment. The main stream of such solid polymer fuel cells is toward those that require hydrogen and oxygen as the fuel thereof. Recently, a direct methanol fuel cell (DMFC) has been proposed, in which methanol is used in place of hydrogen for fuel. This is expected to give high-capacity batteries for mobile devices that are substitutable for lithium secondary batteries, and is now much studied in the art.

The important functions of the electrolytic membrane (proton-exchange membrane) for solid polymer fuel cells are to physically insulate the fuel (e.g., hydrogen, aqueous methanol solution) fed to the anode, catalyst electrode from the oxidizing gas (e.g., oxygen) fed to the cathode, to electrically insulate the anode from the cathode, and to transmit the proton having been formed on the anode to the cathode. To fulfill these functions, the electrolytic membrane must have some mechanical strength and proton conductivity.

In the electrolytic membrane for solid polymer fuel cells, generally used is a sulfonic acid group-having perfluorocarbon polymer such as typically Nafion®. The electrolytic membrane of the type has good ionic conductivity and has relatively high mechanical strength, but has some problems to be solved such as those mentioned below. Concretely, in the electrolytic membrane, water and the sulfonic acid group form cluster channels, and protons move in the cluster channels via water therein. Therefore, the ionic conductivity of the membrane significantly depends on the water content thereof that is associated with the humidity in the service environment in which the cells are driven. For poisoning reduction in the catalyst electrode with CO and for activation of the catalyst electrode therein, solid polymer fuel cells are preferably driven at a temperature falling within a range of from 100 to 150° C. However, within such a middle-temperature range, the water content of the electrolytic membrane in the cells lowers with the reduction in the ionic conductivity thereof, and it causes a problem in that the expected cell characteristics could not be obtained. In addition, the softening point of the electrolytic membrane is around 120° C. and when the cells are driven at a temperature around it, then still another problem with it is that the mechanical strength of the electrolytic membrane is unsatisfactory. On the other hand, when the electrolytic membrane of the type is used in DMFC, then it causes still other problems such as those mentioned below. Naturally, the membrane readily absorbs water and its barrier ability against the fuel methanol is not good. Therefore, methanol having been fed to the anode penetrates through the electrolytic membrane to reach the cathode. Owing to it, the cell output power lowers, and this is referred to as a methanol-crossover phenomenon, and is a serious problem. For practical use of DMFC, this is one important problem to be solved.

Given that situation, there is a growing tendency for the development of other proton-conductive materials substitutable for Nafion®, and some hopeful electrolytic materials have been proposed. For inorganic proton-conductive materials, for example, proton-conductive glass is disclosed (for example, see JP-A 2000-272932, 2000-256007, 2000-357524, 2001-93543; *Journal of Physical Chemistry*, B, 1999, Vol. 103, p. 9468; *Physical Review*, B, 1997, Vol. 55, p. 12108). This is obtained through polymerization of tetraalkoxysilane in the presence of acid in a sol-gel process, and it is known that its humidity dependency is low in a high-temperature range. However, the glass is not flexible and is extremely brittle, and large-area membranes are difficult to produce from it. Therefore, the glass is unsuitable for electrolytes for fuel cells.

For easy film formation based on the good characteristics of inorganic material, one proposal is a nanocomposite material hybridized with polymer material. For example, proposed is a method of forming a proton-exchange membrane by hybridizing a polymer compound having a sulfonic acid group in the side branches, a silicon oxide and a proton acid (for example, see JP-A10-69817, 11-203936, 2001-307752). Another proposal is an organic-inorganic nanohybrid proton-conductive material that is obtained through sol-gel reaction of a precursor, organic silicon compound in the presence of a proton acid (for example, see Japanese Patent 3,103,888, and *Electrochimica Acta*, 1998, Vol. 43, Nos. 10-11, p. 1301). WO03/041091 discloses a proton conducting membrane crosslinked by silicon-oxygen linkages, which is characterized by a fact that it bears a carbon-containing organic-inorganic composite structure covalently bonded to plural silicon-oxygen crosslinks and an acid-containing structure having acid groups. These organic-inorganic composite and hybrid proton-conductive materials comprise an inorganic component and an organic component, in which the inorganic component comprises silicic acid and proton acid and serves as a proton-conductive site and the organic component serves to make the materials flexible. When the inorganic component is increased so as to increase the proton conductivity of the membranes formed of the material, then the mechanical strength of the membranes lowers. On the other hand, however, when the organic component is increased so as to increase the flexibility of the membranes, then the proton conductivity of the membranes lowers. Therefore, the materials that satisfy the two characteristics are difficult to obtain. Regarding the methanol perviousness of the materials, which is an important characteristic of the materials for use in DMFC, satisfactory description is not found in the related literature.

SUMMARY OF THE INVENTION

An object of the present invention is to provide a stable silica sol composition that comprises a sulfonated organosilicon compound, a proton-exchange membrane of low methanol perviousness which is formed of the composition and is favorable for DMFC, a membrane electrode assembly, and a fuel cell that comprises the assembly.

We, the present inventors have found that a silica sol composition obtained through hydrolysis and polycondensation of a compound having a specific structure in the presence of water and an oxidizing agent is highly stable for a long period of time as compared with ordinary silica sol compositions, and have reached the present invention.

In addition, we have further found that, when a sol-gel reaction precursor of an organosilicon compound having a mesogen structure of self-alignability is hybridized with a sol-gel reaction precursor having a proton-donating group, then an organic-inorganic nanohybrid material can be constructed in which the silicon-oxygen matrix site where the mesogen-containing organic molecular chain and the proton-donating group to be a proton-conductive pathway bond to each other is in phase separation in nanosize, and preferably the organic molecular chain is oriented horizontally to the plane of a membrane of the material and the proton-conductive pathway is therefore oriented vertically to the membrane plane. On the basis of these findings, we have reached the present invention.

Specifically, we have found through observation with a polarizing microscope that aggregates of oriented organic molecular chains are formed in an organic-inorganic hybrid proton-exchange membrane produced through sol-gel reaction of an organosilicon compound of a formula (IV) with a proton-donating group-having sol. In this case, the silicon-oxygen network with a proton-donating group bonding thereto, in which the proton-donating group is to be a proton-conductive pathway, is inevitably formed in the direction perpendicular to the orientational direction of the aggregates of organic molecules in the hybrid membrane. Accordingly, controlling the orientational direction of the organic molecular chains horizontally to the hybrid membrane makes it possible to construct proton-conductive pathways that are perpendicular to the membrane plane.

More concretely, the object of the invention can be attained by the following constitution:

(1) A silica sol composition obtained through hydrolysis and polycondensation of at least one precursor of the following formulae (X) and (XI) in the presence of water and an oxidizing agent:

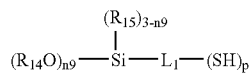

(X)

wherein $L_1$ represents a (p+1)-valent linking group; $R_{14}$ and $R_{15}$ each represent an alkyl group or an aryl group; n9 indicates 2 or 3; at least one $R_{14}$ is an alkyl or aryl group having at least 3 carbon atoms; $R_{14}$'s may be the same or different; and p indicates an integer of from 1 to 3,

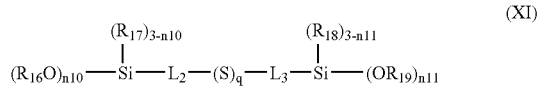

(XI)

wherein $L_2$ and $L_3$ each represent a divalent linking group, $R_{16}$ to $R_{19}$ each represent an alkyl group or an aryl group; n10 and n11 each indicate 2 or 3; at least one $R_{16}$ and at least one $R_{19}$ each are an alkyl or aryl group having at least 3 carbon atoms; and q indicates an integer of from 2 to 4.

(1-1) Preferably, $R_{16}$ to $R_{19}$ in formula (XI) in (1) each are an alkyl group having from 4 to 10 carbon atoms.

(1-2) Preferably, $L_1$, $L_2$ and $L_3$ in (1) each are an alkylene group, an arylene group, or a linking group that comprises a combination of the groups.

(1-3) Preferably, the oxidizing agent in (1) is a water-soluble oxidizing agent.

(1-4) Preferably, the oxidizing agent in (1) is hydrogen peroxide or peracetic acid.

(1-5) Preferably, q in above (1) is 2.

(2) A proton-exchange membrane having a structure of mesogen-containing organic molecular chains and a proton-donating group-containing group covalent-bonding to a silicon-oxygen three-dimensional crosslinked matrix, in which at least a part of the organic molecular chains are oriented to form an aggregate thereof.

(3) The proton-exchange membrane as in (1), which contains a partial structure of the following formula (I):

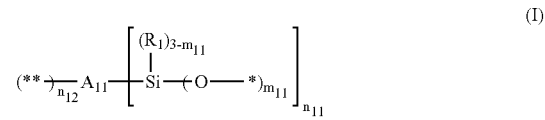

(I)

wherein $A_{11}$ represents a mesogen-containing organic atomic group; $R_1$ represents an alkyl group, an aryl group or a heterocyclic group; $m_{11}$ indicates an integer of from 1 to 3; $n_{11}$ indicates an integer of from 1 to 8; $n_{12}$ indicates an integer of from 0 to 4; * indicates the position at which the structure bonds to a silicon atom; and ** indicates the position at which the structure bonds to an organic polymer chain.

(4) The proton-exchange membrane as in (2) or (3), wherein the proton-donating group covalent-bonds to the silicon-oxygen three-dimensional crosslinked matrix via a structure of the following formula (III):

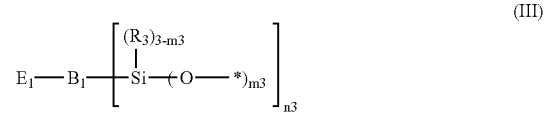

(III)

wherein $B_1$ represents a linking group that contains an aliphatic group and/or an aromatic group; $R_3$ represents an alkyl group or an aryl group; $E_1$ represents a proton-donating group; m3 indicates an integer of from 1 to 3; n3 indicates an integer of from 1 to 4; and * indicates the position at which the structure bonds to a silicon atom.

(5) The proton-exchange membrane as in any of (2) to (4), which is obtained through sol-gel reaction of a precursor, organosilicon compound of the following formula (IV):

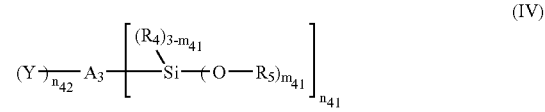

(IV)

wherein $A_3$ represents a mesogen-containing organic atomic group; $R_4$ represents an alkyl group, an aryl group or a heterocyclic group; $R_5$ represents a hydrogen atom, an alkyl group, an aryl group or a silyl group; Y represents a polymerizing group capable of forming a carbon-carbon bond or a carbon-oxygen bond through polymerization; $m_{41}$ indicates an integer of from 1 to 3; $n_{41}$ indicates an integer of from 1 to 8; $n_{42}$ indicates an integer of from 0 to 4; when $m_{41}$ is 2 or more, $R_5$'s may be the same or different.

(6) The proton-exchange membrane as in any of (2) to (5), in which is used a sulfonic acid sol obtained through oxidization of a solution that contains an organosilicon compound of the following formula (IV), and an organosilicon compound of the following formula (VI) and/or (VII):

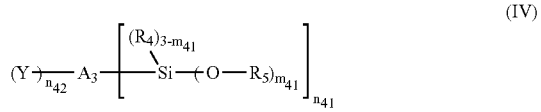
(IV)

wherein $A_3$ represents a mesogen-containing organic atomic group; $R_4$ represents an alkyl group, an aryl group or a heterocyclic group; $R_5$ represents a hydrogen atom, an alkyl group, an aryl group or a silyl group; Y represents a polymerizing group capable of forming a carbon-carbon bond or a carbon-oxygen bond through polymerization; $m_{41}$ indicates an integer of from 1 to 3; $n_{41}$ indicates an integer of from 1 to 8; $n_{42}$ indicates an integer of from 0 to 4; when $m_{41}$ is 2 or more, $R_5$'s may be the same or different,

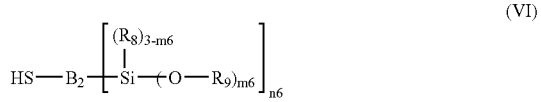
(VI)

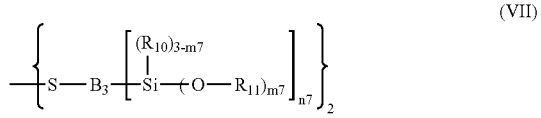
(VII)

wherein $B_2$ and $B_3$ each represent a linking group that contains an aliphatic group and/or an aromatic group; $R_8$ and $R_{10}$ each represent an alkyl group or an aryl group; m6 and m7 each indicate an integer of from 1 to 3; n6 and n7 each indicate an integer of from 1 to 4; $R_9$ and $R_{11}$ each represent a hydrogen atom, an alkyl group, an aryl group or a silyl group; when m6 or m7 is 2 or more, $R_9$'s or $R_{11}$'s may be the same or different.

(7) The proton-exchange membrane as in any of (2) to (5), which is obtained through sol-gel reaction of a compound of the following formula (IV) with from 1 mol % to 50 mol % of a compound of the following formula (VIII):

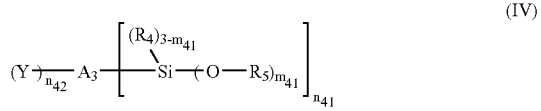
(IV)

wherein $A_3$ represents a mesogen-containing organic atomic group; $R_4$ represents an alkyl group, an aryl group or a heterocyclic group; $R_5$ represents a hydrogen atom, an alkyl group, an aryl group or a silyl group; Y represents a polymerizing group capable of forming a carbon-carbon bond or a carbon-oxygen bond through polymerization; $m_{41}$ indicates an integer of from 1 to 3; $n_{41}$ indicates an integer of from 1 to 8; $n_{42}$ indicates an integer of from 0 to 4; when $m_{41}$ is 2 or more, $R_5$'s may be the same or different,

(VIII)

wherein $A_5$ represents a mesogen-containing organic atomic group; $Z_1$ represents a substituent not changing in sol-gel reaction, or a hydrogen atom; $n_{81}$ indicates an integer of from 1 to 8; $n_{82}$ indicates an integer of from 0 to 4; $Y_2$ represents a polymerizing group capable of forming a carbon-carbon bond or a carbon-oxygen bond through polymerization; when $n_{81}$ is 2 or more, $Z_1$'s may be the same or different.

(8) The proton-exchange membrane as in any of (2) to (5), in which is used a sol obtained through hydrolysis and polycondensation of a precursor of the following formula (XX) in the presence of water and an oxidizing agent:

(XX)

wherein $L_4$ represents a divalent linking group.

(8-2) The proton-exchange membrane as in any of (2) to (5), in which is used a sol obtained through hydrolysis and polycondensation of the organosilicon compound of formula (IV) and the organosilicon compound of formula (XX) in the presence of water and an oxidizing agent.

(9) The proton-exchange membrane as in any of (2) to (4), in which is used a sol obtained through hydrolysis and polycondensation of a precursor of the following formula (X) and/or (XI) in the presence of water and an oxidizing agent:

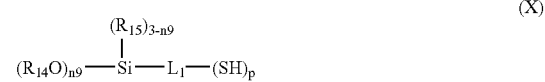
(X)

wherein $L_1$ represents a (p+1)-valent linking group; $R_{14}$ and $R_{15}$ each represent an alkyl group or an aryl group; n9 indicates 2 or 3; at least one $R_{14}$ is an alkyl or aryl group having at least 3 carbon atoms; $R_{14}$'s may be the same or different; and p indicates an integer of from 1 to 3,

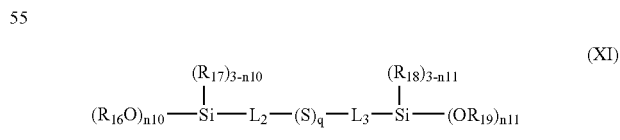
(XI)

wherein $L_2$ and $L_3$ each represent a divalent linking group, $R_{16}$ to $R_{19}$ each represent an alkyl group or an aryl group; n10 and n11 each indicate 2 or 3; at least one $R_{16}$ and at least one $R_{19}$ each are an alkyl or aryl group having at least 3 carbon atoms; $R_{16}$'s and $R_{19}$'s each may be the same or different; and q indicates an integer of from 2 to 4.

(10) A membrane electrode assembly comprising the proton-exchange membrane of any one of (2) to (9).

(11) A fuel cell comprising the proton-exchange membrane of any one of (2) to (9).

BEST MODE FOR CARRYING OUT THE INVENTION

Figure 1:
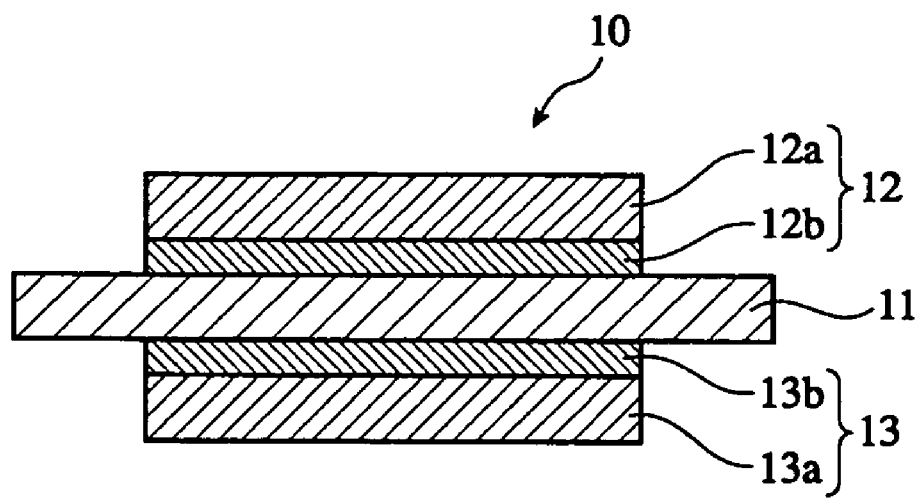
FIG. 1 is a schematic cross-sectional view showing the constitution of a membrane electrode assembly that comprises the proton-exchange membrane of the invention.

[1] Silica Sol Composition:

[1-1] Precursor for Silica Sol Composition:

The silica sol composition of the invention is obtained through hydrolysis and polycondensation of a hydrolyzable silicon alkoxide precursor having a mercapto group and/or a group $—(S)_q—$, and having an alkoxy or aryloxy group with at least 3 carbon atoms, in the presence of water and an oxidizing agent. A compound of the following formula (X) and/or (XI) is used for the precursor.

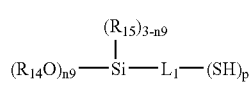

(X)

In formula (X), the alkyl group for $R_{14}$ and $R_{15}$ may be linear or branched, preferably having from 1 to 24 carbon atoms, more preferably from 1 to 10 carbon atoms. Preferred examples of the alkyl group are methyl, ethyl, propyl, butyl, i-propyl, i-butyl, pentyl, hexyl, octyl, 2-ethylhexyl, t-octyl, decyl, dodecyl, tetradecyl, 2-hexyldecyl, hexadecyl, octadecyl, cyclohexylmethyl and octylcyclohexyl groups.

The aryl group for $R_{14}$ and $R_{15}$ may form a condensed ring, preferably having from 6 to 24 carbon atoms. Preferred examples of the aryl group are phenyl, 4-methylphenyl, 3-cyanophenyl, 2-chlorophenyl and 2-naphthyl groups.

The alkyl and aryl groups for $R_{14}$ and $R_{15}$ may be substituted. Examples of the substituents are mentioned below.

1. Alkyl Group:

This is an alkyl group preferably having from 1 to 24 carbon atoms, more preferably from 1 to 10 carbon atoms, and it may be linear or branched. For example, it includes methyl, ethyl, propyl, butyl, i-propyl, i-butyl, pentyl, hexyl, octyl, 2-ethylhexyl, t-octyl, decyl, dodecyl, tetradecyl, 2-hexyldecyl, hexadecyl, octadecyl, cyclohexylmethyl and octylcyclohexyl groups.

2. Aryl Group:

The aryl group may form a condensed ring, preferably having from 6 to 24 carbon atoms. For example, it includes phenyl, 4-methylphenyl, 3-cyanophenyl, 2-chlorophenyl and 2-naphthyl groups.

3. Heterocyclic Group:

The heterocyclic group may form a condensed ring. When it is a nitrogen-containing heterocyclic group, the nitrogen in the ring may be quaternated. Preferably, the heterocyclic group has from 2 to 24 carbon atoms. For example, it includes 4-pyridyl, 2-pyridyl, 1-octylpyridinium-4-yl, 2-pyrimidyl, 2-imidazolyl and 2-thiazolyl groups.

4. Alkoxy Group:

This is an alkoxy group preferably having from 1 to 24 carbon atoms. For example, it includes methoxy, ethoxy, butoxy, octyloxy, methoxyethoxy, methoxypenta(ethyloxy), acryloyloxyethoxy, pentafluoropropoxy and $—O(CH_2CH_2O)_nCH_3$ groups.

5. Acyloxy Group:

This is an acyloxy group preferably having from 1 to 24 carbon atoms. For example, it includes formyloxy, acetyloxy, pivaloyloxy, stearoyloxy, benzoyloxy and p-methoxyphenylcarbonyloxy groups.

6. Alkoxycarbonyl Group:

This is an alkoxycarbonyl group preferably having from 2 to 24 carbon atoms. For example, it includes methoxycarbonyl, ethoxycarbonyl, t-butoxycarbonyl and n-octylcarbonyl groups.

7. Carbamoyloxy Group:

For example, this includes N,N-dimethylcarbamoyloxy, N,N-diethylcarbamoyloxy, morpholinocarbonyloxy, N,N-di-n-octylaminocarbonyloxy and N-n-octylcarbamoyloxy groups.

8. Alkoxycarbonyloxy Group:

For example, this includes methoxycarbonyloxy, ethoxycarbonyloxy, t-butoxycarbonyloxy and n-octyloxycarbonyloxy groups.

9. Aryloxycarbonyloxy Group:

For example, this includes phenoxycarbonyloxy, p-methoxyphenoxycarbonyloxy and p-n-hexadecyloxyphenoxycarbonyloxy groups.

10. Amino Group:

For example, this includes amino, methylamino, dimethylamino, anilino, N-methylanilino and diphenylamino groups.

11. Acylamino Group:

For example, this includes formylamino, acetylamino, pivaloylamino, lauroylamino, benzoylamino and 3,4,5-tri-n-octyloxyphenylcarbonylamino groups.

12. Aminocarbonylamino Group:

For example, this includes carbamoylamino, N,N-dimethylaminocarbonylamino, N,N-diethylaminocarbonylamino and morpholinocarbonylamino groups.

13. Alkoxycarbonylamino Group:

For example, this includes methoxycarbonylamino, ethoxycarbonylamino, t-butoxycarbonylamino, n-octadecyloxycarbonylamino and N-methyl-methoxycarbonylamino groups.

14. Aryloxycarbonylamino Group:

For example, this includes phenoxycarbonylamino, p-chlorophenoxycarbonylamino and m-n-octyloxyphenoxycarbonylamino groups.

15. Sulfamoylamino Group:

For example, this includes sulfamoylamino, N,N-dimethylaminosulfonylamino and N-n-octylaminosulfonylamino groups.

16. Alkyl and Arylsulfonylamino Groups:

For example, these include methylsulfonylamino, butylsulfonylamino, phenylsulfonylamino, 2,3,5-trichlorophenylsulfonylamino and p-methylphenylsulfonylamino groups.

17. Sulfamoyl Group:

For example, this includes N-ethylsulfamoyl, N-(3-dodecyloxypropyl)sulfamoyl, N,N-dimethylsulfamoyl, N-acetylsulfamoyl, N-benzoylsulfamoyl and N—(N'-phenylcarbamoyl)sulfamoyl groups.

18. Alkyl and Arylsulfinyl Groups:

For example, these include methylsulfinyl, ethylsulfinyl, phenylsulfinyl and p-methylphenylsulfinyl groups.

19. Alkyl and Arylsulfonyl Groups:

For example, these include methylsulfonyl, ethylsulfonyl, phenylsulfonyl and p-methylphenylsulfonyl groups.

20. Acyl Group:

For example, this includes acetyl, pivaloyl, 2-chloroacetyl, stearoyl, benzoyl and p-n-octyloxyphenylcarbonyl groups.

21. Aryloxycarbonyl Group:

For example, this includes phenoxycarbonyl, o-chlorophenoxycarbonyl, m-nitrophenoxycarbonyl and p-t-butylphenoxycarbonyl groups.

22. Carbamoyl Group:

For example, this includes carbamoyl, N-methylcarbamoyl, N,N-dimethylcarbamoyl, N,N-di-n-octylcarbamoyl and N-(methylsulfonyl)carbamoyl groups.

23. Silyl Group:

Preferably, this has from 3 to 30 carbon atoms, including, for example, trimethylsilyl, t-butyldimethylsilyl, phenyldimethylsilyl, trimethoxysilyl, triethoxysilyl, dimethoxymethylsilyl, diethoxymethylsilyl and triacetoxysilyl groups.

24. Cyano Group.

25. Fluoro Group.

26. Mercapto Group.

27. Hydroxyl Group.

These groups may be optionally substituted.

n9 indicates 2 or 3; and $R_{14}$'s in $(OR_{14})$'s may be the same or different. At least one $R_{14}$ is an alkyl or aryl group having at least 3 carbon atoms. More preferably, $R_{14}$ is an alkyl group, even more preferably an alkyl group having from 4 to 10 carbon atoms. p indicates an integer of from 1 to 3.

$L_1$ represents a (p+1)-valent linking group. Examples of the linking group are an alkylene group, an alkenylene group, an arylene group, —O—, —S—, —CO—, —NR'— (where R' represents a hydrogen atom or an alkyl group), —SO$_2$—, and combinations of two or more of these. Preferably, $L_1$ is an alkylene group, an arylene group, or their combination.

In formula (X), the substituent of —Si(OR$_{14}$)$_{n9}$(R$_{15}$)$_{3-n9}$ is a hydrolyzable substituent, and it forms a polymer through hydrolysis and condensation in sol-gel reaction, therefore forming a sol and thereafter a gel from it. The sol-gel reaction is described in detail, for example, in Sumio Sakuhana's *Science of Sol-Gel Process* (by Agne-Shofu sha).

Next described is formula (XI).

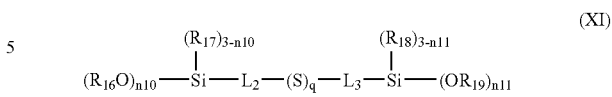

In formula (XI), the alkyl group and the aryl group for $R_{16}$ and $R_{19}$ have the same meanings as those mentioned above for $R_{14}$, and preferred examples for the former are also the same as those mentioned hereinabove for the latter. n9 and n13 each indicate 2 or 3, and at least one $R_{16}$ and at least one $R_{19}$ of $(OR_{16})$'s and $(OR_{19})$'s each have at least 3 carbon atoms. The alkyl group and the aryl group for $R_{17}$ and $R_{18}$ have the same meanings as those mentioned above for $R_{15}$, and preferred examples for the former are also the same as those mentioned hereinabove for the latter. The linking group for $L_2$ and $L_3$ has the same meaning as that mentioned above for $L_1$, and preferred examples for the former are also the same as those mentioned hereinabove for the latter. q indicates an integer of from 2 to 4, and is preferably 2.

The groups SH and —(S)$_q$— can be converted into a sulfo group through oxidation with an oxidizing agent. The converted sulfo group acts as a catalyst for sol-gel reaction to promote the reaction.

Specific examples of the precursor of formulae (X) and (XI) for use in preparing the silica sol composition of the invention are mentioned below, to which, however, the invention is not limited.

(T-1)

(T-2)

(T-3)

(T-4)

(T-5)

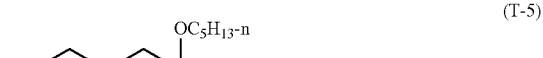
(T-6)

(T-7)

(T-8)

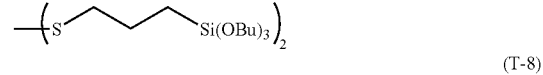
(T-9)

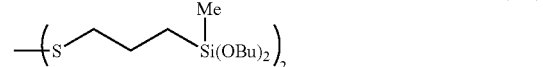
(T-10)

(T-11) 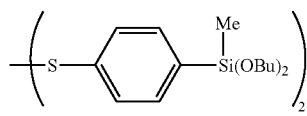

(T-12) 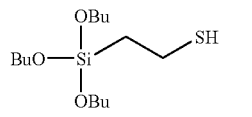

(T-13) 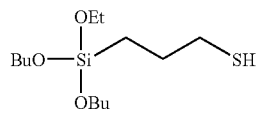

(T-14) 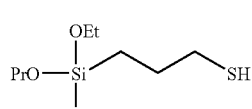

(T-15) 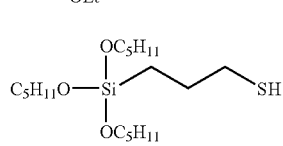

(T-16) 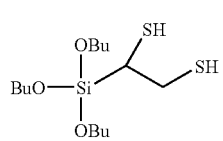

(T-17) 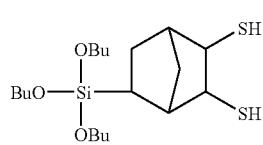

(T-18) 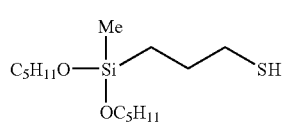

(T-19) 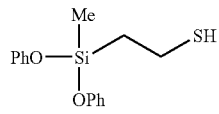

(T-20) 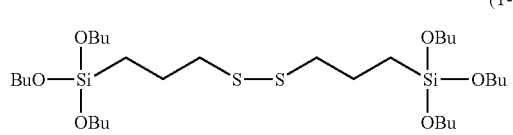

(T-21) 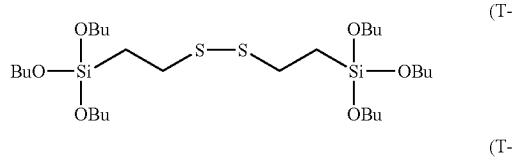

(T-22) 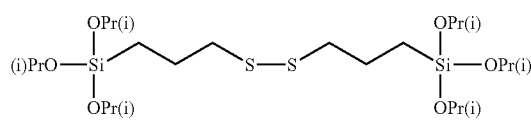

(T-23) 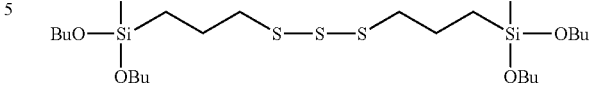

(T-24) 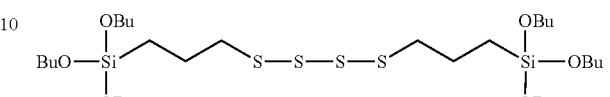

(T-25)

(T-26)

(T-27)

[1-2] Method of Forming Silica Sol Composition:

In the invention, employed is an ordinary sol-gel process of forming a sol through hydrolysis and polycondensation of a metal alkoxide. For example, methods described in Sumio Sakuhana's *Science of Sol-Gel Process* (by Agne-Shofu sha) are employable herein. One typical method of sol formation is described. The precursor described in above [1-1] is dissolved in a solvent, to which are added water and an oxidizing agent whereby the SH group and/or the $-(S)_q-$ group in the precursor is oxidized by the oxidizing agent into a sulfo group. The resulting sulfo group serves as a catalyst for sol-gel reaction and promotes the reaction. Accordingly, the method does not additionally require an acid catalyst such as hydrochloric acid or the like used in conventional methods, but the catalyst may be optionally added to it. With the progress of the sol-gel reaction, the viscosity of the reaction liquid gradually increases and a fluid sol is obtained.

For the oxidizing agent for oxidation of the group SH or $-(S)_q-$, usable are those capable of oxidizing sulfur compounds, and they are described in, for example, *Lecture of Experimental Chemistry* (by Maruzen). Examples of the oxidizing agent are compounds of halogen such as iodine, bromine; organic peracids such as peracetic acid, 3-chloroperbenzoic acid, monoperphthalic acid; and hydrogen peroxide, potassium permanganate, etc. Preferably, the oxidizing agent for use herein is soluble in water, including, for example, hydrogen peroxide and peracetic acid.

The solvent for the sol-gel reaction is not specifically defined so far as it dissolves the precursors. For it, however, preferred are carbonate compounds (e.g., ethylene carbonate, propylene carbonate), heterocyclic compounds (e.g., 3-methyl-2-oxazolidinone, N-methylpyrrolidone), cyclic ethers (e.g., dioxane, tetrahydrofuran), linear ethers (e.g., diethyl ether, ethylene glycol dialkyl ether, propylene glycol dialkyl ether, polyethylene glycol dialkyl ether, polypropylene glycol dialkyl ether), alcohols (e.g., methanol, ethanol, isopropanol, ethylene glycol monoalkyl ether, propylene glycol monoalkyl ether, polyethylene glycol monoalkyl ether, polypropylene glycol monoalkyl ether), polyalcohols (e.g., ethylene glycol, propylene glycol, polyethylene glycol, polypropylene glycol, glycerin), nitrile compounds (e.g., acetonitrile, glutarodinitrile, methoxyacetonitrile, propionitrile, benzonitrile), esters (e.g., carboxylates, phosphates, phosphonates), aprotic polar substances (e.g., dimethylsulfoxide, sulforane, dimethylformamide, dimethylacetamide), non-polar solvents (e.g., toluene, xylene), chlorine-containing solvents (e.g., methylene chloride, ethylene chloride), water, etc. Above all, preferred are alcohols such as ethanol, isopropanol; nitrile compounds such as acetonitrile, glutarodinitrile, methoxyacetonitrile, propionitrile, benzonitrile; and cyclic ethers such as dioxane, tetrahydrofuran. Especially preferred are water-soluble solvents. One or more of these may be used herein either singly or as combined. The total amount of the solvent is preferably from 0.1 to 100 g, more preferably from 1 to 10 g, per gram of the precursor compound.

For controlling the reactivity of the precursor in sol-gel reaction, a chemical modifier capable of chelating with metal atoms may be used. The chemical modifier includes, for example, acetacetates (e.g., ethyl acetacetate), 1,3-diketones (e.g., acetylacetone), acetacetamides (e.g., N,N'-dimethylaminoacetacetamide).

The amount of water for hydrolysis in sol-gel reaction may be larger or smaller than the theoretical amount for complete hydrolysis of the silyl group in the precursor. So far as water added thereto does not separate from the solvent in the reaction liquid, the uppermost limit of its amount is not specifically defined. Preferably, the amount of water is at least 0.1 molar equivalents, more preferably at least 0.5 molar equivalents relative to the alkoxy group existing on the silicon atom in the precursor.

The amount of the oxidizing agent is preferably from 1 to 10 times, more preferably from 1 to 5 times the theoretical amount for oxidization of the SH group and/or the $-(S)_q-$ group into a sulfo group.

An inorganic or organic proton acid serving as an acid catalyst may be used in the reaction liquid for promoting the sol-gel reaction of the liquid. The inorganic proton acid includes, for example, hydrochloric acid, sulfuric acid, boric acid, nitric acid, perchloric acid, tetrafluoroboric acid, hexafluoroarsenic acid, hydrobromic acid. The organic proton acid includes, for example, acetic acid, oxalic acid, methanesulfonic acid. Two or more such proton acids may be used herein, as combined.

The reaction temperature in sol-gel reaction is associated with the reaction speed, and it may be suitably determined depending on the type and the amount of the precursor and the oxidizing agent used. Preferably, it falls between −20 and 150° C., more preferably between 0 and 80° C., even more preferably between 20 and 60° C.

[2] Mesogen-containing Organosilicon Compound and Sulfonic Acid Group-containing Precursor:

The proton-exchange membrane of the invention has a structure of mesogen-containing organic molecular chains and a proton-donating group-containing group covalent-bonding to a silicon-oxygen three-dimensional crosslinked matrix therein. The proton-exchange membrane has a partial structure of formula (I):

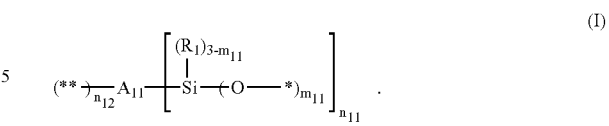

In this, the alkyl group, the aryl group and the heterocyclic group for $R_1$ have the same meanings as the alkyl group, the aryl group and the heterocyclic group for $R_4$ mentioned hereinabove; and the mesogen-containing organic atomic group for $A_{11}$ has the same meaning as the mesogen-containing organic atomic group for $A_3$ also mentioned hereinabove. m11 has the same meaning as m41; and nil has the same meaning as n41.

Accordingly, the partial structure of formula (I) may be formed, for example, through sol-gel reaction of the mesogen-containing organosilicon compound of formula (IV). The precursors for forming the organosilicon compound structure and the partial structure of formula (III) are described in detail hereinunder.

[2-1] Mesogen-containing Organosilicon Compound:
In the organosilicon compound of formula (IV):

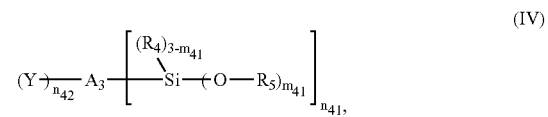

$R_4$ represents an alkyl group, an aryl group or a heterocyclic group. Preferred examples of the alkyl group for $R_4$ are linear, branched or cyclic alkyl groups (e.g., those having from 1 to 20 carbon atoms, such as methyl, ethyl, isopropyl, n-butyl, 2-ethylhexyl, n-decyl, cyclopropyl, cyclohexyl, cyclododecyl); preferred examples of the aryl group for $R_4$ are substituted or unsubstituted phenyl or naphthyl groups having from 6 to 20 carbon atoms. Preferred examples of the heterocyclic group for $R_4$ are substituted or unsubstituted 6-membered heterocyclic groups (e.g., pyridyl, morpholino), and substituted or unsubstituted 5-membered heterocyclic groups (e.g., furyl, thiophenyl). Preferred examples of the silyl group for $R_5$ are silyl groups substituted with three alkyl groups selected from alkyl groups having from 1 to 10 carbon atoms (e.g., trimethylsilyl, triethylsilyl, triisopropylsilyl), and polysiloxane groups (e.g., $-(Me_2SiO)_nH$ where n=10 to 100).

$R_5$ represents a hydrogen atom, an alkyl group, an aryl group or a silyl group. Preferred examples of the alkyl group and aryl group for it are the same as those for $R_4$ mentioned hereinabove.

$A_3$ represents a mesogen-containing organic atomic group. Preferred examples of the mesogen group are described in Dietrich Demus & Horst Zaschke, *Flussige Kristalle in Tablellen II*, 1984, pp. 7-18. Those of the following formula (XIII) are especially preferred:

In formula (XIII), $Q_{11}$ and $Q_{12}$ each represent a divalent linking group or a single bond. The divalent linking group is preferably —CH═CH—, —CH═N—, —N═N—, —N(O)═N—, —COO—, —COS—, —CONH—, —COCH$_2$—, —CH$_2$CH$_2$—, —OCH$_2$—, —CH$_2$NH—, —CH$_2$—, —CO—, —O—, —S—, —NH—, —$(CH_2)_{(1\ to\ 3)}$—, —CH=CH—COO—, —CH=CH—CO—, —$(C\equiv C)_{(1\ to\ 3)}$—, or their combination, more preferably —$CH_2$—, —CO—, —O—, —CH=CH—, —CH=N—, —N=N—, or their combination. The hydrogen atom of these divalent linking groups may be substituted with any other substituent. Especially preferably, $Q_{11}$ and $Q_{12}$ are single bonds.

Y represents a divalent, 4-to 7-membered ring residue, or a condensed ring residue composed of such rings; and m9 indicates an integer of from 1 to 3. Preferably, Y is a 6-membered aromatic group, a 4-to 6-membered saturated or unsaturated aliphatic group, a 5-or 6-membered heterocyclic group, or their condensed ring. Preferred examples of Y are the following substituents (Y-1) to (Y-28) and their combinations. Of these substituents, more preferred are (Y-1), (Y-2), (Y-18), (Y-19), (Y-21) and (Y-22); and even more preferred are (Y-1), (Y-2) and (Y-21).

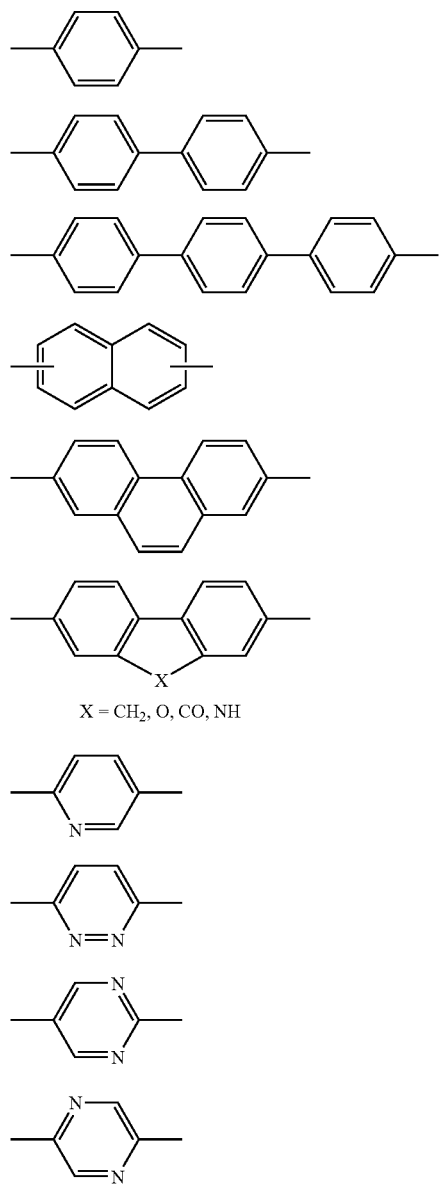

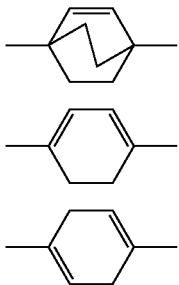

(Y-26)

(Y-27)

(Y-28)

Preferably, the organosilicon compound contains an alkyl or alkylene group having at least 5 carbon atoms, along with the mesogen group therein for further enhancing the molecular orientation thereof. More preferably, the alkyl or alkylene group has from 5 to 25 carbon atoms, even more preferably from 6 to 18 carbon atoms. The alkyl or alkylene group in the organosilicon compound may be substituted. Preferred examples of the substituent for the group are mentioned below.

1. Alkyl Group:

For this, referred to are those mentioned hereinabove in the section [1] silica sol composition.

2. Aryl Group:

For this, referred to are those mentioned hereinabove in the section [1] silica sol composition.

3. Heterocyclic Group:

For this, referred to are those mentioned hereinabove in the section [1] silica sol composition.

4. Alkoxy Group:

More preferably, the alkoxy group has from 1 to 24 carbon atoms, including, for example, methoxy, ethoxy, butoxy, octyloxy, methoxyethoxy, methoxypenta(ethyloxy), acryloyloxyethoxy and pentafluoropropoxy groups.

5. Acyloxy Group:

More preferably, the acyloxy group has from 1 to 24 carbon atoms, including, for example, acetyloxy and benzoyloxy groups.

6. Alkoxycarbonyl Group:

More preferably, the alkoxycarbonyl group has from 2 to 24 carbon atoms, including, for example, methoxycarbonyl and ethoxycarbonyl groups.

7. Cyano group.

8. Fluoro group.

9. Alkoxycarbonyloxy group.

Y represents a polymerizing group capable of forming a carbon-carbon or carbon-oxygen bond to produce a polymer. For example, it includes acryloyl, methacryloyl, vinyl and ethynyl groups, and alkylene oxides (e.g., ethyleneoxide, trimethylene oxide). Of those, preferred are acryloyl, methacryloyl, ethylene oxide and trimethylene oxide groups.

In formulae (IV), the silyl group ($-Si(OR_5)_{m41}(R_4)_{3-m41}$) directly bonds to the mesogen group, the alkyl group or the alkenyl group that constitutes the organic atomic group $A_3$, or bonds thereto via a linking group. The linking group is preferably an alkylene group having from 1 to 15 carbon atoms, or a combination of such an alkylene group and the linking group $Q_{11}$, $Q_{12}$ of the mesogen. Preferably, the silyl group bonds to the alkylene group.

Preferably, m41 is 3, and n41 is from 1 to 3. Specific examples of the organosilicon compounds are mentioned below, to which, however, the invention is not limited.

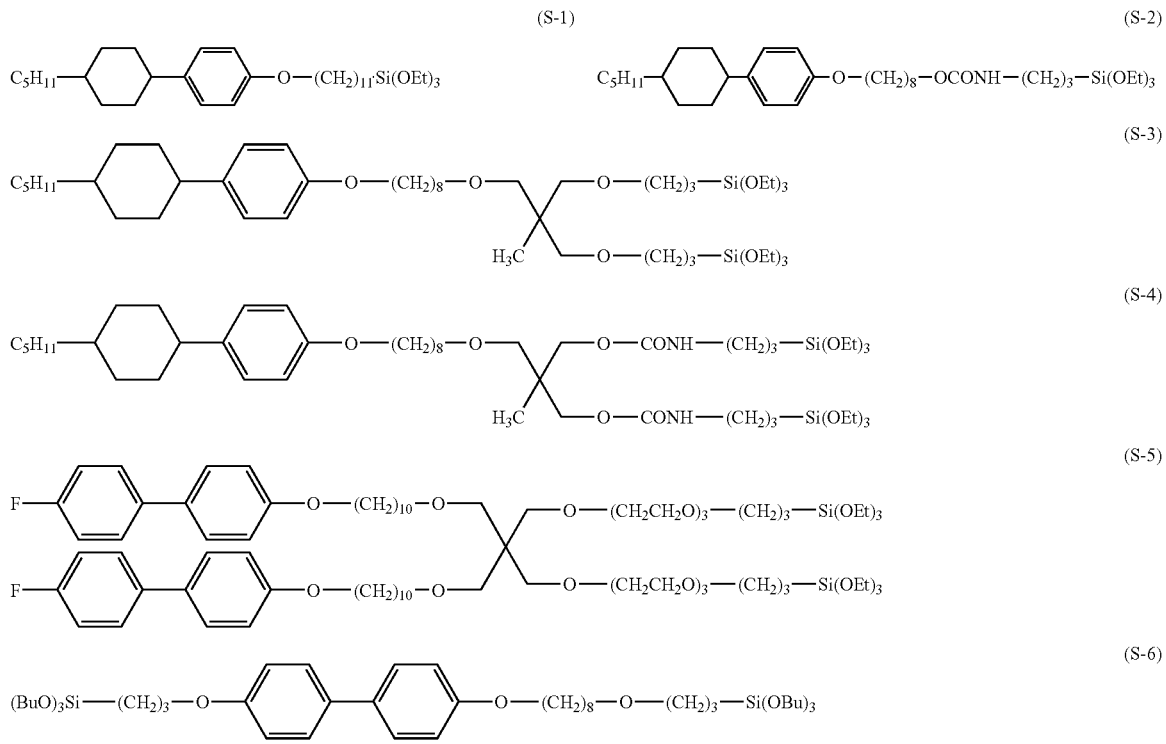

-continued
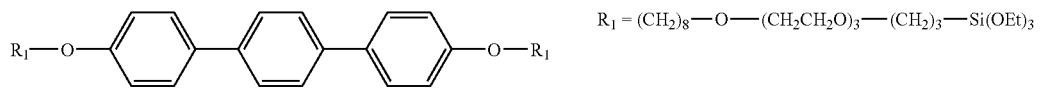
(S-7)
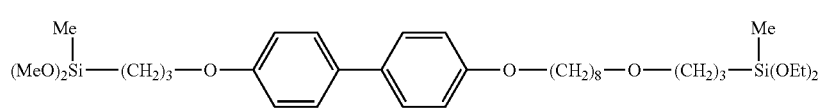
(S-8)
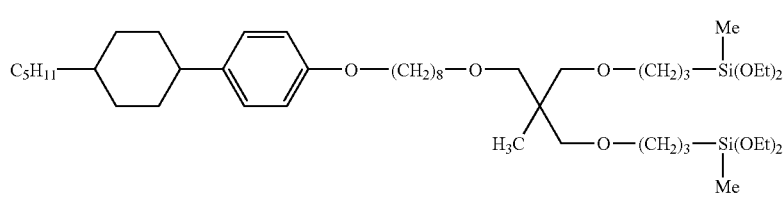
(S-9)
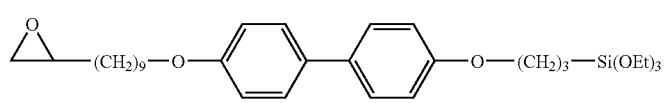
(S-10)
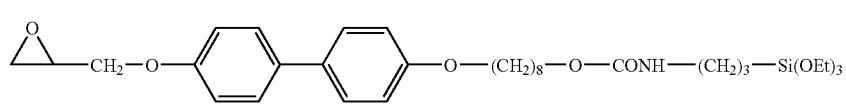
(S-11)
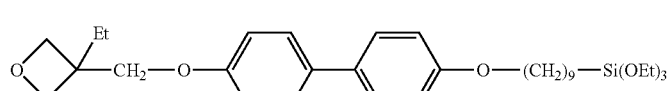
(S-12)
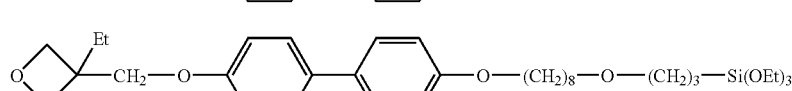
(S-13)
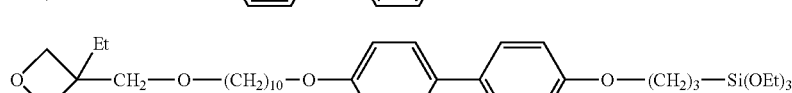
(S-14)
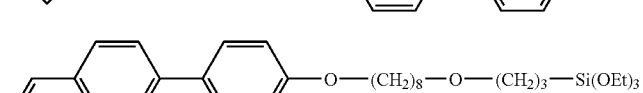
(S-15)
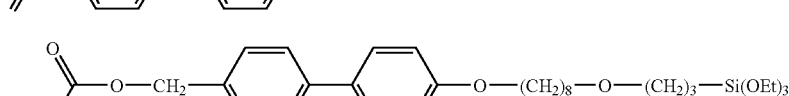
(S-16)
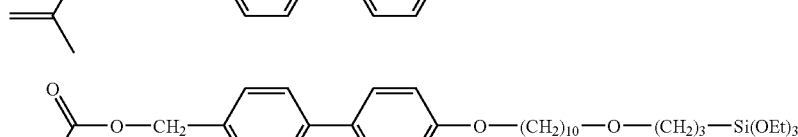
(S-17)
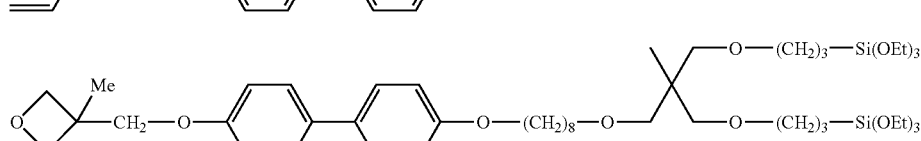
(S-18)
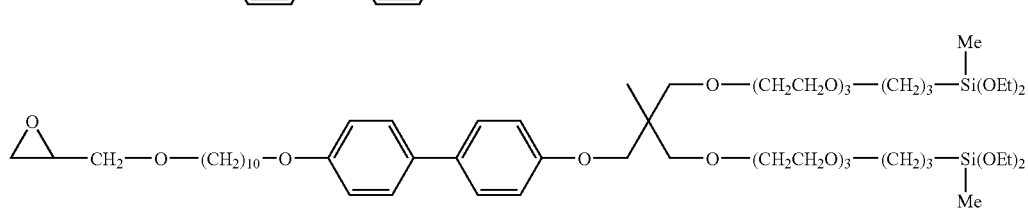
(S-19)

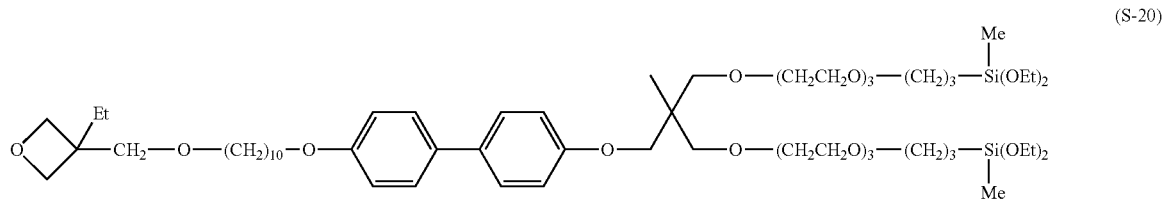
(S-20)
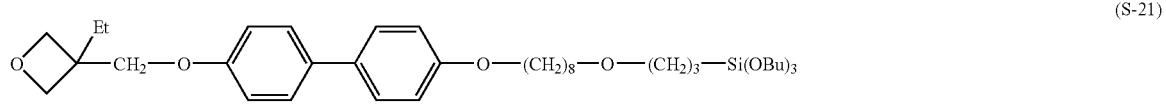
(S-21)
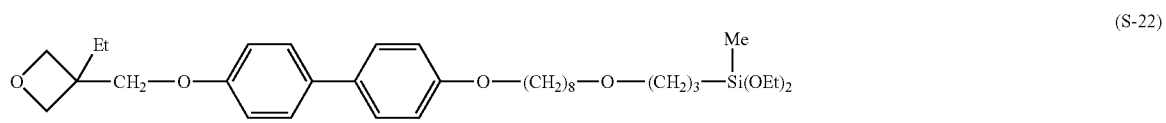
(S-22)
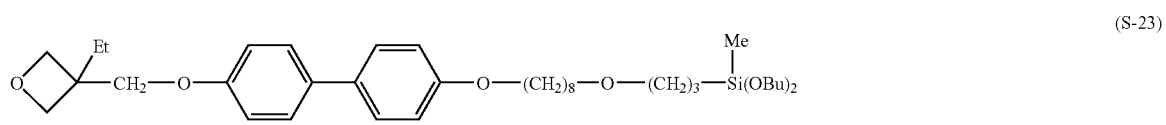
(S-23)
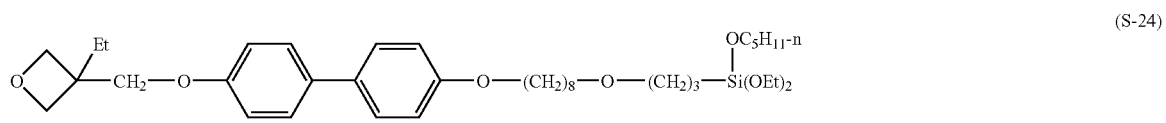
(S-24)
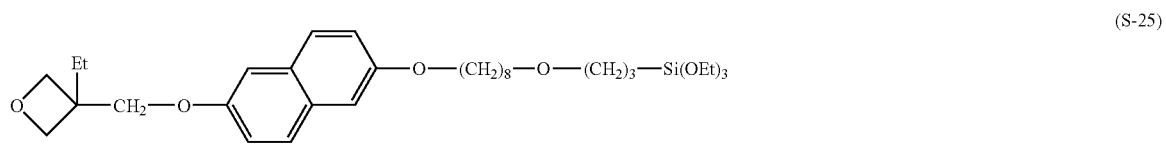
(S-25)
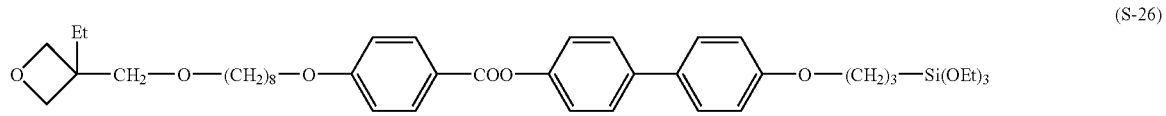
(S-26)
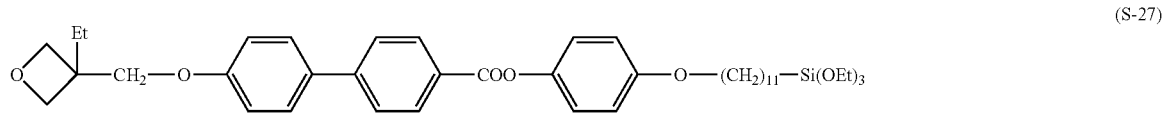
(S-27)
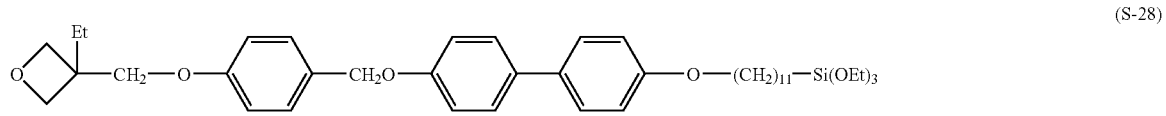
(S-28)
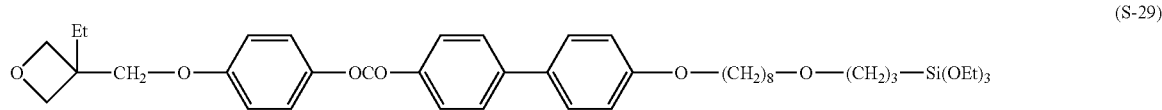
(S-29)
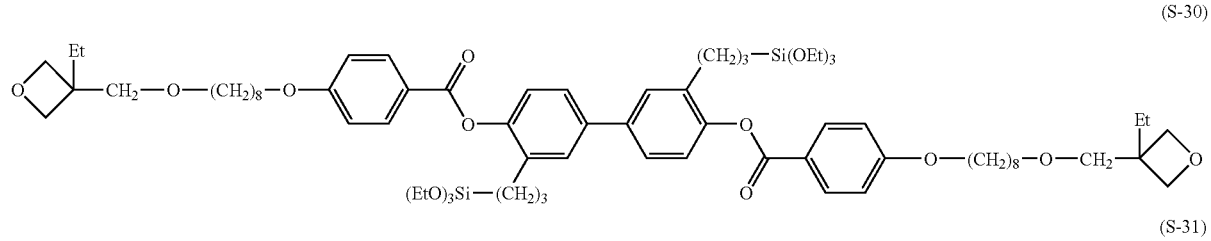
(S-30)
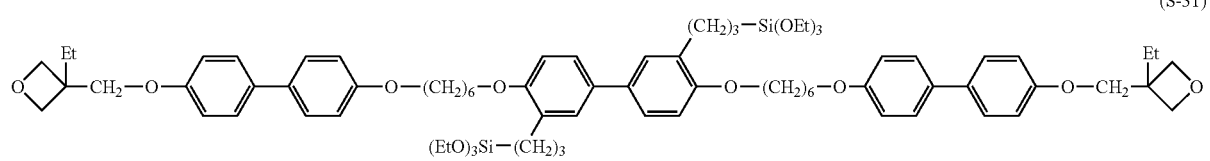
(S-31)

-continued
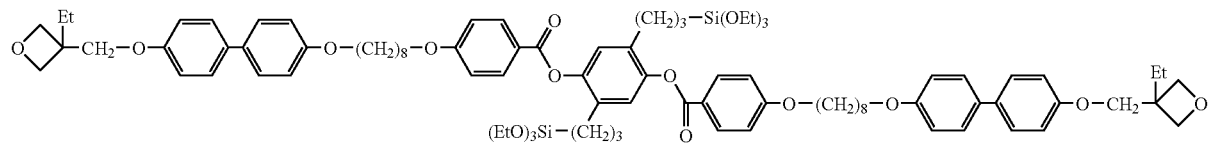
(S-32)
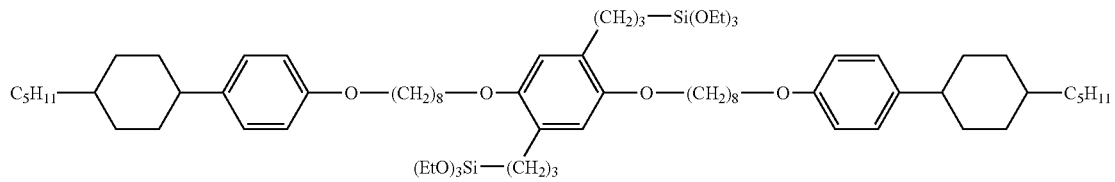
(S-33)
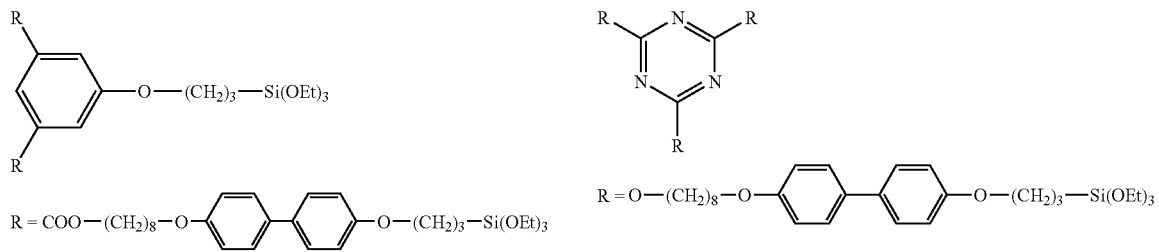
(S-34) (S-35)
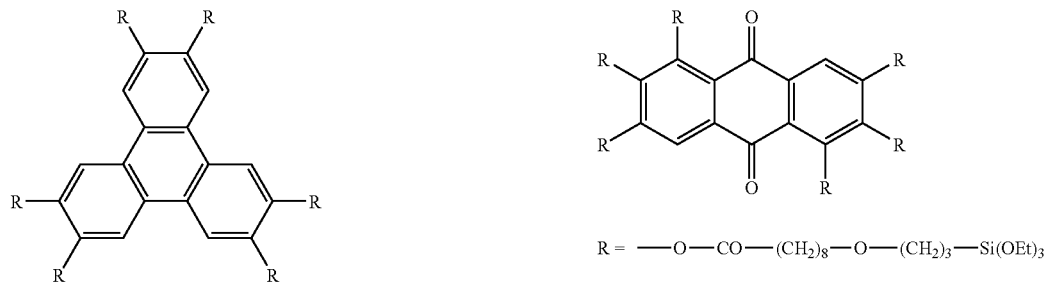
(S-36) (S-37)
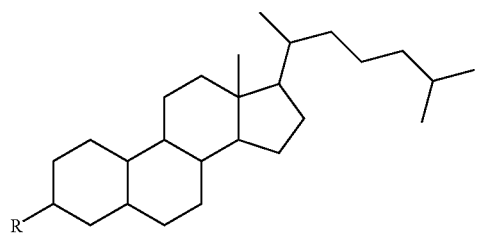
(S-38)
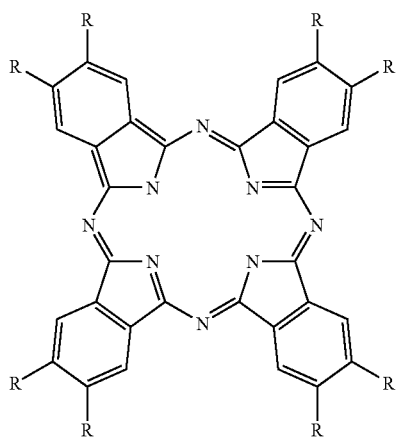
(S-39)

[2-2] Proton-donating Group-having Precursor:

In the proton-exchange membrane of the invention, the group that contains the proton-donating group $E_1$ preferably bonds to the silicon-oxygen three-dimensional crosslinked matrix via a partial structure of formula (III) mentioned above. The partial structure of formula (III) maybe formed through sol-gel reaction of a compound of the following formula (IX):

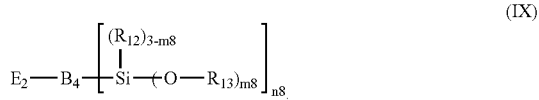

(IX)

In formula (IX), $E_2$ represents a proton-donating group, and is preferably an acid residue having a pKa of at most 4. Preferred examples of the proton-donating group $E_2$ are —$SO_3H$, —$P(O)(OH)$, —$OP(O)(OH)_2$, —COOH. More preferably, $E_2$ is —$SO_3H$ of low pKa. $R_{12}$, $R_{13}$, m8 and n8 have the same meanings as those of $R_4$, $R_5$, m41 and n41, respectively, in formula (IV). $B_4$ represents a linking group formed of an organic atomic group that contains an aliphatic group and/or an aromatic group. Its examples are an alkylene group having from 1 to 12 carbon atoms, and a phenylene group, and their combinations. The linking group may be interrupted by a divalent linking group of $Q_{11}$ as in formula (XIII). The linking group $B_4$ may be optionally substituted.

(1) The precursor of formula (IX) readily condenses and gels because of its own acid. For it, therefore, it is desirable that a precursor sol prepared by oxidizing a solution of a sulfide or disulfide compound of the following formula (VI) and/or (VII) is used in forming the proton-exchange membrane of the invention.

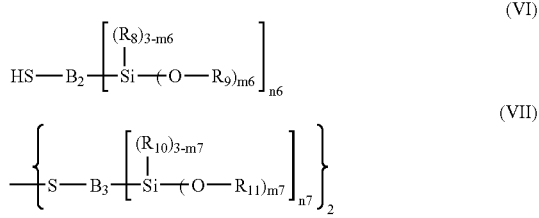

(VI)

(VII)

In formulae (VI) and (VII), $B_2$ and $B_3$ each represent a linking group that contains an aliphatic group and/or an aromatic group; $R_8$ and $R_{10}$ each represent an alkyl group or an aryl group; m6 and m7 each indicate an integer of from 1 to 3; n6 and n7 each indicate an integer of from 1 to 4; $R_9$ and $R_{11}$ each represent a hydrogen atom, an alkyl group, an aryl group or a silyl group; when m6 or m7 is 2 or more, $R_9$'s or $R_{11}$'s may be the same or different.

More concretely, $B_2$ and $B_3$, $R_8$ and $R_{10}$, $R_9$ and $R_{11}$, m6 and m7, and n6 and n7 in formulae (VI) and (VII) have the same meanings as those of $B_4$, $R_{12}$, $R_{13}$, m8 and n8, respectively, in formula (IX). $E_1$, $B_1$, $R_3$, m3 and n3 in formula (III) have the same meanings as those of $E_2$, $B_4$, $R_{12}$, m8 and n8 in formula (IX). The linking group for $B_2$ and $B_3$ in formulae (VI) and (VII) is preferably a propylene, methylene or phenylene group. Also preferably, at least one $R_9$ and at least one $R_{11}$ each have at least 4 carbon atoms. Also preferably, m6 and m7 each are 2 or 3, and n6 and n7 each are 1.

(2) It is also desirable that a sol obtained through hydrolysis and polycondensation of a hydrolyzable silicon alkoxide precursor that has a mercapto group and/or a group of —$(S)_q$— and also an alkoxy or aryloxy group having at least 3 carbon atoms, in the presence of water and an oxidizing agent, is used for the precursor sol in forming the proton-exchange membrane of the invention. Concretely, the silicon alkoxide precursor may be a compound of formula (X) and/or (XI) mentioned above.

For the compounds of formulae (VI), (VII), (X) and/or (XI) described in the above (1) and/or (2), for example, referred to are those mentioned hereinabove in the section of [1-1] precursor for silica sol composition and (T-28) to (T-30) below. In addition, the compounds of formula (XX) such as (T-28) to (T-30) below are also employable for them. In formula (XX), $L_4$ represents a divalent linking group. Preferably, for example, it is an alkylene group having from 1 to 15 carbon atoms, more preferably from 1 to 5 carbon atoms, an arylene group having from 6 to 15 carbon atoms, more preferably from 6 to 10 carbon atoms, or their combination. Compounds that can be used in the present invention are not limited to the specifically exemplified compounds herein.

(T-28)

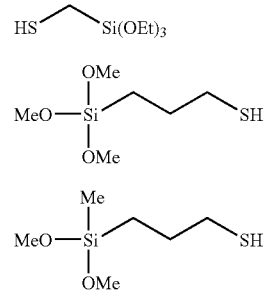

(T-29)

(T-30)

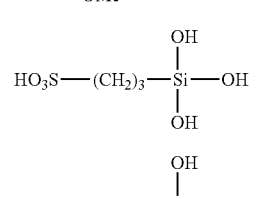

(T-31)

(T-32)

(T-33)

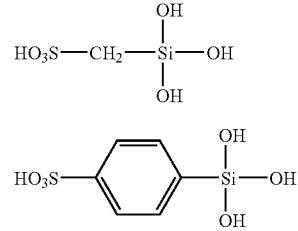

(T-34)

[3] Method of Forming Organic-inorganic Hybrid Proton-exchange Membrane:

[3-1] Sol-gel Process:

In the invention, generally employed is a sol-gel process that comprises metal alkoxide hydrolysis, condensation and drying (optionally firing) to give a solid. For example, herein employable are the methods described in JP-A 2000-272932, 2000-256007, 2000-357524; Japanese Patent 3,103,888; *Electrochimica Acta*, 1998, Vol. 43, Nos. 10-11, p.

1301; and the above [1-2]. An acid catalyst is generally used for condensation. However, in the invention where the precursors described in the above [1-1] and [1-2] are used for the reaction, the precursors described in [1-2] may serve as acid catalysts. Therefore, the reaction in invention does not require any additional acid to be added thereto.

One typical method of forming the proton-exchange membrane of the invention comprises dissolving a compound of formula (VI) and/or (VII) in a solvent (e.g., methanol, ethanol, isopropanol) followed by adding an oxidizing agent thereto to thereby convert the group —SH or —S—S— in the compound into —$SO_3H$. The resulting sol is mixed with an organosilicon compound described in [2-1] and dissolved in a solvent, thereby effecting alkoxysilyl hydrolysis and polycondensation (this is hereinafter referred to as "sol-gel" reaction). Alternatively, a compound of formula (VI) and/or (VIII) and an organosilicon compound as in [2-1] are dissolved in a solvent (e.g., methanol, ethanol, isopropanol), then an oxidizing agent is added to it to thereby convert the group —SH or —S—S— in the compound into —$SO_3H$, and thereafter the sol-gel reaction is promoted further. In this stage, the reaction system may be heated, if desired. The viscosity of the reaction mixture (sol) gradually increases, and after the solvent is evaporated away and the remaining sol is dried, then a solid (gel) is obtained. While fluid, the sol may be cast into a desired vessel or applied onto a substrate, and thereafter the solvent is evaporated away and the remaining sol is dried to give a solid membrane. For further densifying the Si—O—Si network formed therein, the membrane may be optionally heated after dried.

For further promoting the sol-gel reaction, an acid catalyst may be used. For the acid catalyst, preferred is an inorganic or organic proton acid. The inorganic proton acid includes, for example, hydrochloric acid, sulfuric acid, phosphoric acids (e.g., $H_3PO_4$, $H_3PO_3$, $H_4P_2O_7$, $H_5P_3O_{10}$, metaphosphoric acid, hexafluorophosphoric acid), boric acid, nitric acid, perchloric acid, tetrafluoroboric acid, hexafluoroarsenic acid, hydrobromic acid, solid acids (e.g., tungstophosphoric acid, tungsten-peroxo complex). For the organic proton acid, for example, usable are low-molecular compounds such as phosphates (for example, those with from 1 to 30 carbon atoms, such as methyl phosphate, propyl phosphate, dodecyl phosphate, phenyl phosphate, dimethyl phosphate, didodecyl phosphate), phosphites (for example, those with from 1 to 30 carbon atoms, such as methyl phosphite, dodecyl phosphite, diethyl phosphite, diisopropyl phosphite, didodecyl phosphite), sulfonic acids (for example, those with from 1 to 15 carbon atoms, such as benzenesulfonic acid, toluenesulfonic acid, hexafluorobenzenesulfonic acid, trifluoromethanesulfonic acid, dodecylsulfonic acid), carboxylic acids (for example, those with from 1 to 15 carbon atoms, such as acetic acid, trifluoroacetic acid, benzoic acid, substituted benzoic acids), imides (e.g., bis(trifluoromethanesulfonyl)imido acid, trifluoromethanesulfonyltrifluoroacetamide), phosphonic acids (for example, those with from 1 to 30 carbon atoms, such as methylphosphonic acid, ethylphosphonic acid, phenylphosphonic acid, diphenylphosphonic acid, 1,5-naphthalenebisphosphonic acid); and proton acid segment-having high-molecular compounds, for example, perfluorocarbonsulfonic acid polymers such as typically Nafion®, poly(meth)acrylates having a phosphoric acid group in side branches (JP-A 2001-114834), and sulfonated, heat-resistant aromatic polymers such as sulfonated polyether-ether ketones (JP-A 6-93111), sulfonated polyether sulfones (JP-A 10-45913), sulfonated polysulfones (JP-A 9-245818). Two or more of these may be used herein, as combined.

For controlling the reactivity of the precursors in the sol-gel reaction, a chemical modifier capable of chelating with metal atoms may be used. The chemical modifier includes, for example, acetacetates (e.g., ethyl acetacetate), 1,3-diketones (e.g., acetylacetone), acetacetamides (e.g., N,N'-dimethylaminoacetacetamide).

The reaction temperature in the sol-gel reaction is associated with the reaction speed, and it may be suitably determined depending on the reactivity of the precursors to be reacted and on the type and the amount of the acid used. Preferably, it falls between –20 and 150° C., more preferably between 0 and 80° C., even more preferably between 20 and 60° C.

[2-2] Polymerization of Polymerizable Group Y:

When the polymerizable group Y is carbon-carbon unsaturated bond-having group, for example, a (meth)acryloyl, vinyl or ethynyl group, then radical polymerization of an ordinary polymer production may apply to the case. The process is described in Takayuki Ohtsu & Masaetsu Kinoshita, *Experimental Process for Polymer Production* (by Kagaku Dojin), and Takayuki Ohtsu, *Lecture of Polymerization Theory* 1, Radical Polymerization (1) (by Kagaku Dojin). The radical polymerization includes thermal polymerization with a thermal polymerization initiator and photopolymerization with a photopolymerization initiator. Preferred examples of the thermal polymerization initiator are azo-type initiators such as 2,2'-azobis(isobutyronitrile), 2,2'-azobis(2,4-dimethylvaleronitrile), dimethyl 2,2'-azobis (2-methylpropionate); and peroxide-type initiators such as benzoyl peroxide. Preferred examples of the photopolymerization initiator are α-carbonyl compounds (U.S. Pat. Nos. 2,367,661 and 2,367,670), acyloin ethers (U.S. Pat. No. 244,828), α-hydrocarbon-substituted aromatic acyloin compounds (U.S. Pat. No. 2,722,512), polynuclear quinone compounds (U.S. Pat. Nos. 3,046,127 and 2,951,758), combinations of triarylimidazole dimer and p-aminophenyl ketone (U.S. Pat. No. 35,493,676), acridine and phenazine compounds (JP-A 60-105667, U.S. Pat. No. 4,239,850), and oxadiazole compounds (U.S. Pat. No. 4,212,970).

The polymerization initiator may be added to the reaction system before the start of the sol-gel reaction in the above [2-1], or may be added to the reaction product after the sol-gel reaction and immediately before the application of the reaction product to substrates. Preferably, the amount of the polymerization initiator to be added is from 0.01 to 20% by mass, more preferably from 0.1 to 10% by mass relative to the total amount of the monomers.

When the polymerizable group Y is an alkylene oxide group such as ethylene oxide or trimethylene oxide, then the polymerization catalyst to be used in the case may be a proton acid (as in the above [2-1]), or a Lewis acid (preferably, boron trifluoride (including its ether complex), zinc chloride, aluminium chloride). In case where the proton acid used in the sol-gel reaction serves also as the polymerization catalyst, then it does not require any additional proton acid specifically for the polymerization of the polymerizable group Y. When used, the polymerization catalyst is preferably added to the reaction product just before the product is applied to substrates. In general, the polymerization is promoted in the membrane being formed on substrates through exposure of the membrane to heat or light. With that, the molecular orientation in the membrane is fixed and the membrane strength is enhanced.

[2-3] Combination with Other Silicon Compound:

If desired, two or more precursors described in the above [1-1] and [1-2] may be mixed for use herein for improving the properties of the membranes formed. For example, precursor compounds of formula (IV) or (V) where m4 or m5 is 3 or 2, respectively, are mixed, or precursor compounds of formula (IX) where m8 is 3 or 2 are mixed, or these are combined to form more flexible membranes. Optionally, any other silicon compound may be further added to these precursors. Examples of the additional silicon compound are organosilicon compounds of the following formula (XII), and their polymers.

$$(R_{20})_{m10}\text{—Si—}(OR_{21})_{4-m10} \quad \text{(XXII)}$$

wherein $R_{20}$ represents a substituted or unsubstituted alkyl, aryl or heterocyclic group; $R_{21}$ represents a hydrogen atom, an alkyl group, an aryl group, or a silyl group; m10 indicates an integer of from 0 to 4; when m10 or (4-m10) is 2 or more, then $R_{20}$'s or $R_{21}$'s may be the same or different; and the substituent of $R_{20}$ or $R_{21}$ may bond to any other to form a polymer.

In formula (XII), m10 is preferably 0 or 1, and $R_{20}$ is preferably an alkyl group. Examples of preferred compounds where m10 is 0 are tetramethoxysilane (TMOS) and tetraethoxysilane (TEOS). Examples of preferred compounds where m10 is 1 are mentioned below.

When the compound of formula (XII) is combined with the organosilicon compound precursors, then its amount is preferably from 1 to 50 mol %, more preferably from 1 to 20 mol % of the precursors.

[3-4] Plasticizer Compound:

A plasticizer compound of the following formula (VIII), not changing in sol-gel reaction, may be added to the proton-exchange membrane of the invention to soften the membrane. Its amount may be from 1 mol % to 50 mol %, preferably from 5 mol % to 20 mol % relative to the number of mols of the compound of formula (IV).

$$(Y_2)_{\overline{n_{82}}}A_5\text{—}(Z_1)_{n_{81}} \quad \text{(VIII)}$$

In formula (VIII), $A_5$ represents a mesogen-containing organic atomic group, and this has the same meaning as that of $A_3$ in the mesogen-containing organosilicon compound of formula (IV) described in the section [2-1]. Preferably, the mesogen in the compound is the same as that in the mesogen-containing organosilicon compound to be used in forming the proton-exchange membrane of the invention. $Z_1$ represents a substituent not changing in sol-gel reaction, or a hydrogen atom. Preferred examples of the substituent are the following 1 to 9 mentioned in the section of [2-1], 1. alkyl group,
2. aryl group,
3. heterocyclic group,

(X-1)

(X-2)

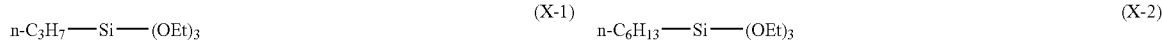
(X-3) (X-4)

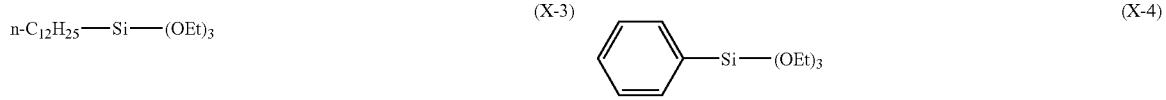
(X-5) (X-6)

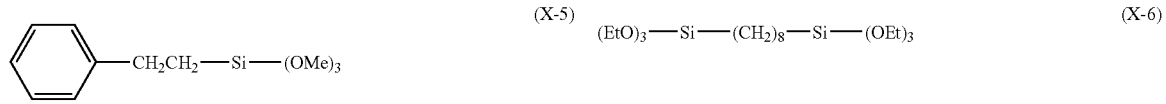
(X-7)

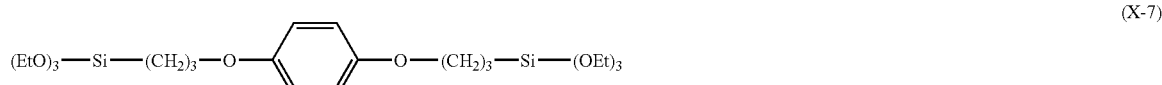
(X-8)

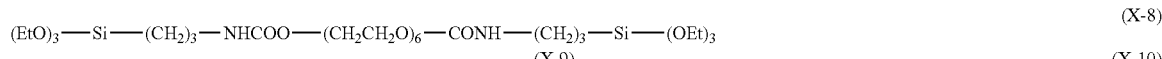
(X-9) (X-10)

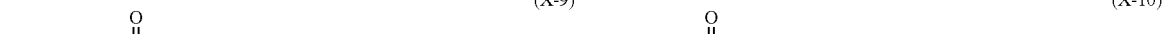
(X-11) (X-12)

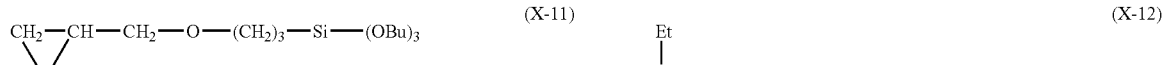

(X-13)

4. alkoxy group,
5. acyloxy group,
6. alkoxycarbonyl group,
7. cyano group,
8. fluoro group,
9. alkoxycarbonyloxy group, as well as a hydroxyl group, an acid residues such as carboxyl, sulfo, sulfino or phosphono groups, and a vinyl group. Of those, especially preferred are a hydrogen atom, a hydroxyl group, acid residues and a vinyl group. $n_{81}$ indicates an integer of from 1 to 6, but is preferably 1 or 2. $n_{82}$ indicates an integer of from 0 to 4, but is preferably 1 or 2. Y2 represents a polymerizing group capable of forming a carbon-carbon bond or a carbon-oxygen bond through polymerization, and has the same meaning as $Y_1$ in the organosilicon compound of formula (IV) described in the section [2-1]. Preferably, $Y_2$ is the same as $Y_1$ in the mesogen-containing organosilicon compound to be used in forming the proton-exchange membrane of the invention. When $n_{81}$ is 2 or more, $Z_1$'s may be the same or different.

Specific examples of the compound of formula (VIII) are mentioned below, to which, however, the invention is not limited.

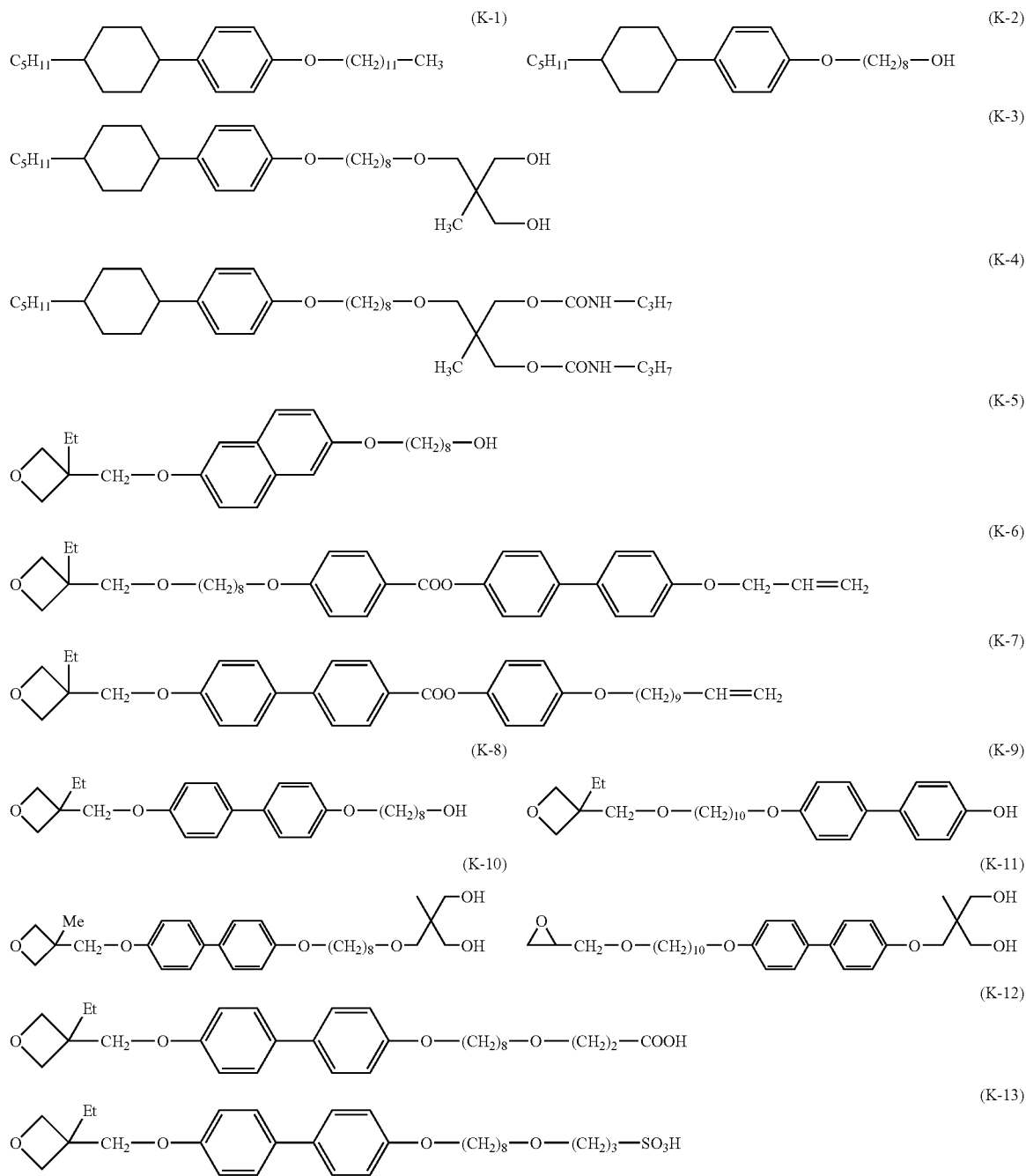

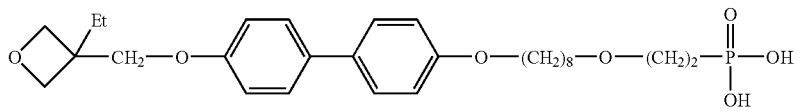
(K-14)

(K-15)

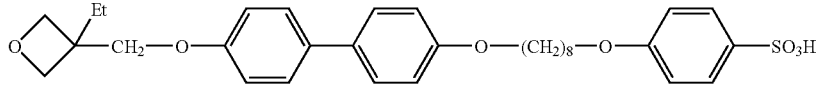
(K-16)

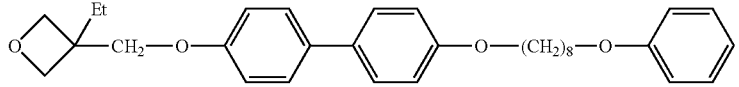
(K-17)

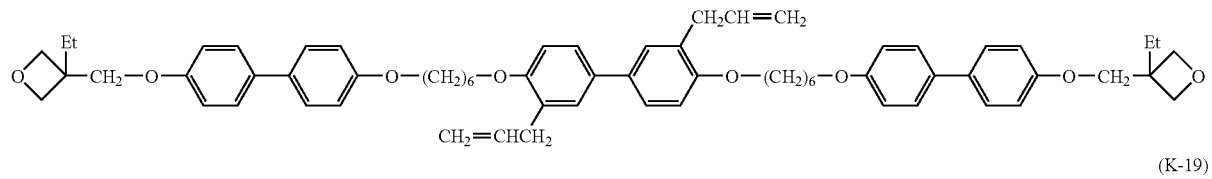
(K-18)

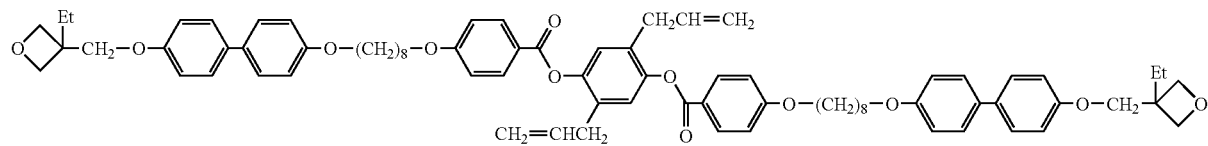
(K-19)

[3-5] Addition of Polymer Compound:

Various polymer compounds may be added to the proton-exchange membrane of the invention for the purpose of (1) enhancing the mechanical strength of the membrane and (2) increasing the acid concentration in the membrane. For the purpose of (1) enhancing the mechanical strength of the membrane, preferred are polymer compounds having a molecular weight of from 10,000 to 1,000,000 or so and miscible with the proton-conductive material of the invention. For example, preferred are perfluoropolymer, polystyrene, polyethylene glycol, polyoxetane, poly(meth)acrylate, polyether ketone, polyether sulfone, and their copolymers. Preferably, the content of the polymer compound is from 1 to 30% by mass. For the purpose of (2) increasing the acid concentration in the membrane, preferred are polymer compounds having a proton acid site, for example, perfluorocarbonsulfonic acid polymer such as typically Nafion, and poly(meth) acrylate having a phosphoric acid group in the side branches, sulfonated polyether-ester ketone, sulfonated polyether sulfone, sulfonated polysulfone, sulfonated polybenzimidazole and other sulfonated products of heat-resistant aromatic polymers. Preferably, the content of the polymer compound is from 1 to 30% by mass.

[3-6] Film Formation:

The supports to which the sol-gel reaction mixture is applied in the invention are not specifically defined, and their preferred examples are glass substrates, metal substrates, polymer films and reflectors. Examples of the polymer films are cellulose polymer films of TAC (triacetyl cellulose), ester polymer films of PET (polyethylene terephthalate) or PEN (polyethylene naphthalate), fluoropolymer films of PTFE (polytrifluoroethylene), and polyimide films. Any known method of, for example, curtain coating, extrusion coating, roll coating, spin coating, dip coating, bar coating, spraying, slide coating or printing is herein employable for applying the sol-gel reaction mixture to the supports.

The sol-gel reaction of the organosilicon compound precursor goes on while the organic site of the organosilicon compound is oriented after the sol-gel reaction mixture that contains the precursor is applied onto a substrate. To promote the orientation of the sol-gel composition, various methods may be employed. For example, supports such as those mentioned above may be previously oriented. The orientation may be effected in any ordinary method. Preferably, an orientable liquid-crystal layer of, for example, various orientable polyimide films or polyvinyl alcohol films is formed on a support, and rubbed for orientation; or the sol-gel composition applied on a support is put in a magnetic field or an electric field, or it is heated.

The orientation of the organic-inorganic hybrid proton-exchange membrane can be confirmed through observation of the optical anisotropy of the membrane with a polarizing microscope. Direction of the observation is not limited. When a sample is rotated under crossed nicols and a boundary of light and dark is observed, the sample is optically anisotoropic. So long as the optical anisotropy can be observed, the orientation is not specifically limited. When a texture that is recognizable as a liquid crystal phase is observed, the kind of the phase can be determined. The phase may be a lyotropic liquid crystal phase and a thermotropic liquid crystal phase. In regard to orientation, the lyotropic liquid crystal phase is preferably any one of a hexagonal phase, a cubic phase, a lamella phase, a sponge phase or micelle phase. More preferred is a lyotropic liquid crystal phase showing a lamella phase or a sponge phase at a room temperature. The thermotropic liquid crystal phase is preferably any one of a nematic phase, a smectic phase, a crystalline phase, a columnar phase and a cholesteric phase. More preferred is a thermotropic liquid crystal phase showing a smectic phase or a crystalline phase at a room temperature. The orientation of these phases is preferably maintained in a solid state. The term "isotropic" is referred to as a state in which direction vectors of molecules are anisotropic.

The thickness of the organic-inorganic hybrid proton-exchange membrane thus obtained by peeling it from a support is preferably from 10 to 500 μm, more preferably from 25 to 100 μm.

[3-7] Infiltration into Porous Film:

The proton-conductive material of the invention may be infiltrated into the pores of a porous substrate to form a film. The sol-gel reaction liquid of the invention may be applied onto a porous substrate to form a film thereon; or a porous substrate may be dipped in the sol-gel reaction liquid so as to make the pores of the substrate filled with a proton-conductive material to form a film. Preferred examples of such a porous substrate are porous polypropylene, porous polytetrafluoroethylene, porous crosslinked heat-resistant polyethylene and porous polyimide films.

[3-8] Addition of Catalyst Metal to Proton-conductive Film:

An active metal catalyst may be added to the proton-exchange membrane of the invention for promoting the redox reaction of anode fuel and cathode fuel. The fuel having penetrated into the proton-exchange membrane that contains the catalyst may be well consumed in side the proton-exchange membrane, not reaching any other electrode, and this is effective for preventing crossover. The active metal for the catalyst is not specifically defined provided that it functions as an electrode catalyst. For it, for example, preferred is platinum or platinum-based alloy.

[4] Fuel Cell:

[4-1] Constitution of Fuel Cell:

A fuel cell is described, which comprises the proton-conductive membrane of the invention. FIG. 1 shows the constitution of a membrane electrode assembly (hereinafter referred to as "MEA") 10. The MEA 10 comprises a proton-exchange membrane 11, and an anode 12 and a cathode 13 that are opposite to each other via the membrane 11.

The anode 12 and the cathode 13 each comprise a porous conductive sheet (e.g., carbon paper) 12a, 13a, and a catalyst layer 12b, 13b. The catalyst layer 12b, 13b is formed of a dispersion of carbon particles (e.g., ketjen black, acetylene black, carbon nanotube) that carry a catalyst metal such as platinum particles thereon, in a proton-conductive material (e.g., Nafion). For air tightly adhering the catalyst layers 12b, 13b to the proton-exchange membrane 11, generally employed is a method of hot-pressing the porous conductive sheets 12a, 13a each coated with the catalyst layer 12b, 13b, against the proton-exchange membrane 11 (preferably at 120 to 130° C. under 2 to 100 kg/cm$^2$); or a method of pressing the catalyst layers 12b, 13b each formed on a suitable support, against the proton-exchange membrane 11 while transferring the layers onto the membrane, followed by making the resulting laminate structure sandwiched between the porous conductive sheets 12a, 13a.

[4-2] Catalyst Material:

For the anode and the cathode, for example, a catalyst that carries active metal particles of platinum or the like on a carbon material may be used. The particle size of the active metal particles that are generally used in the art is from 2 to 10 nm. The particles having a smaller particle size are favorable since the surface area thereof per the unit mass may be larger and therefore the activity thereof may be higher. If too small, however, the particles will be difficult to disperse with no aggregation. Therefore, it is said that the lowermost limit of the particle size is 2 nm or so.

In hydrogen-oxygen fuel cells, the active polarization of anode (hydrogen electrode) is higher than that of cathode (air electrode). This is because the cathode reaction (oxygen reduction) is slow as compared with the anode reaction. For enhancing the oxygen electrode activity, usable are various platinum-based binary alloys such as Pt—Cr, Pt—Ni, Pt—Co, Pt—Cu, Pt—Fe. In a direct methanol fuel cell in which aqueous methanol is used for the anode fuel, it is a matter of importance that the catalyst poisoning with CO that is formed during methanol oxidation must be inhibited. For this purpose, usable are platinum-based binary alloys such as Pt—Ru, Pt—Fe, Pt—Ni, Pt—Co, P—Mo, and platinum-based ternary alloys such as Pt—Ru—Mo, Pt—Ru—W, Pt—Ru—Co, Pt—Ru—Fe, Pt—Ru—Ni, Pt—Ru—Cu, Pt—Ru—Sn, Pt—Ru—Au.

For the carbon material that carries the active metal thereon, preferred are acetylene black, Vulcan XC-72, ketjen black, carbon nanohorn (CNH), carbon nanotube (CNT).

[4-3] Constitution and Material of Catalyst Layer:

The function of the catalyst layer includes (1) transporting fuel to active metal, (2) providing the reaction site for oxidation of fuel (anode) and for reduction thereof (cathode), (3) transmitting the electrons formed through the redox reaction to collector, and (4) transporting the protons formed through the reaction to proton-conductive membrane. For (1), the catalyst layer must be porous so that liquid and vapor fuel may penetrate into the depth thereof. The active metal catalyst described in [4-2] acts for (2); and the carbon material also described in [4-2] acts for (3). For attaining the function of (4), the catalyst layer shall contain a proton-conductive material added thereto.

The proton-conductive material to be in the catalyst layer is not specifically defined provided that it is a solid that has a proton-donating group. For it, for example, preferred are acid reside-having polymer compounds that are used for the proton-conductive membrane (e.g., perfluorocarbonsulfonic acids such as typically Nafion; phosphoric acid-branched poly(meth)acrylates; sulfonated, heat-resistant aromatic polymers such as sulfonated polyether-ether ketones, sulfonated polybenzimidazoles), and acid-fixed organic-inorganic hybrid proton-conductive materials (see JP-A 2000-272932, 2000-256007, 2000-357524, 2001-93543, 10-69817, 11-203936, 2001-307752; *Journal of Physical Chemistry*, B, 1999, Vol. 103, p. 9468; *Physical Review*, B, 1997, Vol. 55, p. 12108; Japanese Patent 3,103,888; and *Electrochimica Acta,* 1998, Vol. 43, Nos. 10-11, p. 1301). As the case may be, the proton-conductive material that is obtained through sol-gel reaction of the precursor for the proton-exchange membrane of the invention may also be used for the catalyst layer. This embodiment is favorable since the proton-conductive membrane and the catalyst layer are formed of a material of the same type and therefore the adhesiveness between the proton-conductive membrane and the catalyst layer is high.

The amount of the active metal to be used herein is preferably from 0.03 to 10 mg/cm$^2$ from the viewpoint of the cell output and from the economical viewpoint. The amount of the carbon material that carries the active metal is preferably from 1 to 10 times the mass of the active metal. The amount of the proton-conductive material is preferably from 0.1 to 0.7 times the mass of the active metal-carrying carbon.

[4-4] Porous Conductive Sheet (Electrode Substrate):

The porous conductive sheet may be referred to as an electrode substrate, a diffusive layer or a lining material, and it acts as a collector and also acts to prevent water from staying therein to worsen vapor diffusion. In general, carbon paper or carbon cloth may be used for the sheet. If desired, the sheet may be processed with PTFE so as to be repellent to water.

[4-5] Formation of MEA (Membrane Electrode Assembly):

For forming MEA, for example, preferred are the following four methods:

(1) Proton-exchange membrane coating method: A catalyst paste (ink) that comprises basic ingredients of active metal-carrying carbon, proton-conductive material and solvent is directly applied onto both sides of a proton-exchange membrane, and a porous conductive sheet is (thermally) adhered under pressure thereto to construct a 5-layered MEA.

(2) Porous conductive sheet coating method: The catalyst paste is applied onto the surface of a porous conductive sheet to form a catalyst layer thereon, and a proton-exchange membrane is adhered thereto under pressure to construct a 5-layered MEA.

(3) Decal method: The catalyst paste is applied onto PTFE to form a catalyst layer thereon, and the catalyst layer alone is transferred to a proton-exchange membrane to construct a 3-layered MEA. A porous conductive sheet is adhered thereto under pressure to construct a 5-layered MEA.

(4) Catalyst post-carrying method: Ink prepared by mixing a platinum powder-carrying carbon material and a proton-conductive material is applied onto a proton-exchange membrane, a porous conductive sheet or PTFE to form a film, and platinum ions are infiltrated into the film and platinum particles are precipitated in the film through reduction to thereby form a catalyst layer. After the catalyst layer is formed, it is processed according to the method of (1) to (3) to construct MEA.

[4-6] Fuel and Method of Fuel Supply:

Fuel for fuel cells that comprise a solid polymer membrane is described. For anode fuel, usable are hydrogen, alcohols (e.g., methanol, isopropanol, ethylene glycol), ethers (e.g., dimethyl ether, dimethoxymethane, trimethoxymethane), formic acid, boron hydride complexes, ascorbic acid, etc. For cathode fuel, usable are oxygen (including oxygen in air), hydrogen peroxide, etc.

In direct methanol fuel cells, the anode fuel may be aqueous methanol having a methanol concentration of from 3 to 64% by mass. As in the anode reaction formula ($CH_3OH+H_2O \rightarrow CO_2+6H^++6e$), 1 mol of methanol requires 1 mol of water, and the methanol concentration in the case corresponds to 64% by mass. A higher methanol concentration in fuel is more effective for reducing the mass and the volume of the cell including the fuel tank of the same energy capacity. On the other hand, a lower methanol concentration in fuel is more effective for preventing methanol from penetrating through the proton-conductive membrane to react with oxygen on the cathode side to thereby lower the voltage, or that is, for preventing the crossover phenomenon, and as a result, the output is prevented from lowering. To that effect, the optimum concentration of methanol shall be determined, depending on the methanol previousness of the proton-conductive membrane used. The cathode reaction formula in direct methanol fuel cells is ($3/2O_2+6H^++6e \rightarrow H_2O$), and oxygen (e.g., oxygen in air) is used for the fuel in the cells.

For supplying the anode fuel and the cathode fuel to the respective catalyst layers, for example, employable are two methods, (1) a method of forcibly circulating the fuel by the use of an auxiliary device such as pump (active method), and (2) a method not using such an auxiliary device (for example, liquid fuel is supplied through capillarity or by spontaneously dropping it, and vapor fuel is supplied by exposing the catalyst layer to air—passive method). These methods may be combined for anode and cathode. Combining the methods is advantageous in the following points: Water formed in the active cathode site may be circulated, and high-concentration methanol is usable as fuel; air supply enables high output from the cells; and the fuel supply system of the type make it possible to down-size the cells with ease. The active-system cells may be therefore readily down-sized, and owing to this advantage, the cells are free from the problem of rate-limiting fuel supply and stalling in high-output operation.

[4-7] Cell Stacking:

The unit cell voltage of fuel cells is generally at most 1 V. Therefore, many cells are stacked up in series, depending on the necessary voltage for load. For cell stacking, for example, employable are a method of "plane stacking" that comprises placing unit cells on a plane, and a method of "bipolar stacking" that comprises stacking up unit cells via a separator with a fuel pathway formed on both sides thereof. In the former, the cathode (air electrode) is on the surface of the stacked structure and it may readily take air there into. In this, since the stacked structure may be thinned, it is more favorable for small-sized fuel cells. Apart from these, MEMS may be employed, in which a silicon wafer is processed to form a micropattern and fuel cells are stacked on it.

[5] Fuel Cell Application:

Fuel cells may have many applications, for example, for automobiles, electric and electronic appliances for household use, mobile devices, portable devices, etc. In particular, direct methanol fuel cells maybe down-sized, the weight thereof may be reduced and they do not require charging. Having such many advantages, therefore, they are expected to be used for various energy sources for handy appliances and portable appliances. For handy appliances, for example, they may be used for mobile phones, mobile notebook-size personal computers, electronic still cameras, PDA, video cameras, mobile gamedrivers, mobile servers, wearable personal computers, mobile displays. For other portable appliances, for example, they may be used for portable generators, outdoor lighting devices, pocket lamps, electrically-powered (or assisted) bicycles, etc. In addition, they are also favorable for power sources for robots for industrial and household use and for other tools. Moreover, they are further usable as power sources for charging secondary batteries that are mounted on these appliances.

Figure 2:
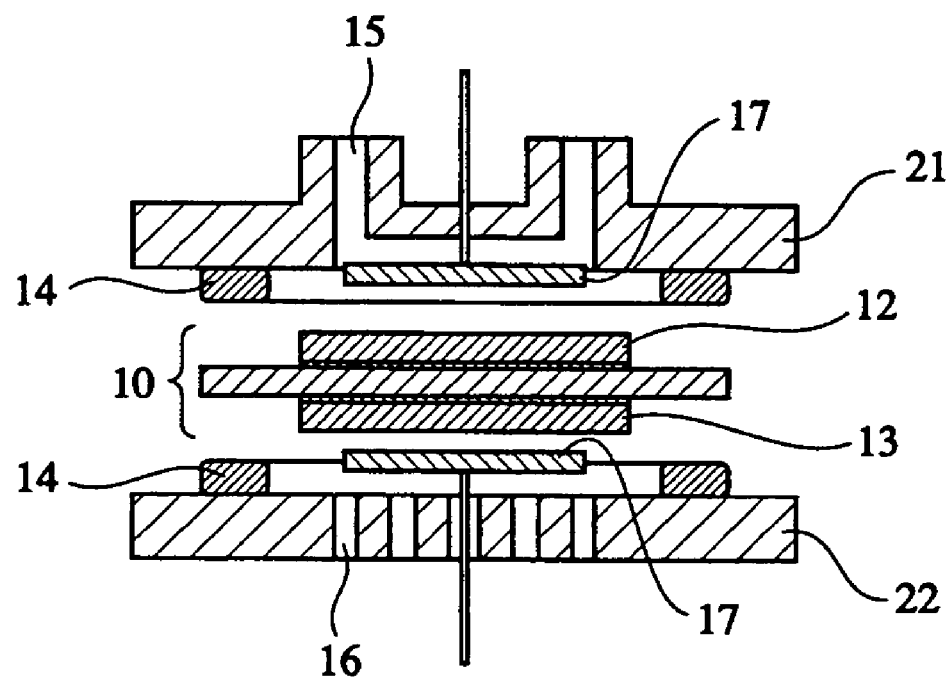
FIG. 2 is a schematic cross-sectional view showing one example of the constitution of the fuel cell of the invention.

FIG. 2 shows one example of a fuel cell. The fuel cell comprises the MEA 10, a pair of separators 21, 22 between which the MEA 10 is sandwiched, and a collector 17 of a stainless net and a gasket 14 both fitted to the separators 21, 22. The anode-side separator 21 has an anode-side opening 15 formed through it; and the cathode-side separator 22 has a cathode-side opening 16 formed through it. Vapor fuel such as hydrogen or alcohol (e.g., methanol) or liquid fuel such as aqueous alcohol solution is fed to the cell via the anode-side opening 15; and an oxidizing gas such as oxygen gas or air is thereto via the cathode-side opening 16.

EXAMPLES

The invention is described in more detail with reference to the following Examples. The materials, amounts, ratios, types and procedures of treatments and so forth shown in the following examples can be suitably changed unless such changes depart from the gist of the present invention. Accordingly, the scope of the present invention should not be construed as limited to the following specific examples.

Example 1

(1) Preparation of Silica Sol Composition from Precursor (T-3):

3.22 g of a precursor (T-3) was dissolved in 10.3 g of methanol, to which was added 5 g of aqueous 30% hydrogen peroxide. The resulting mixture was stirred at room temperature for 24 hours, and then subjected to NMR, which confirmed the absence of —SH from the precursor (T-3) and the presence of —SO$_3$H in the thus-processed compound. Thus prepared, the sol (SOL-1) was colorless transparent, and was stable for 10 days (not gelled but kept homogeneous) in a cold and dark place (5° C.).

(2) Preparation of Silica Sol Composition from Precursor (T-1):

2.94 g of a precursor (T-1) was dissolved in 9.0 g of methanol, to which was added 6 g of aqueous 30% hydrogen peroxide. The resulting mixture was stirred at room temperature for 24 hours, and then subjected to NMR, which confirmed the absence of —SH from the precursor (T-1) and the presence of —SO$_3$H in the thus-processed compound. Thus prepared, the sol (SOL-2) was colorless transparent, and was stable for 7 days in a cold and dark place (5° C.).

(3) Preparation of Silica Sol Composition from Precursor (T-15):

3.65 g of a precursor (T-15) was dissolved in 12 g of 2-propanol, to which was added 6 g of aqueous 30% hydrogen peroxide. The resulting mixture was stirred at room temperature for 24 hours, and then subjected to NMR, which confirmed the absence of —SH from the precursor (T-15) and the presence of —SO$_3$H in the thus-processed compound. Thus prepared, the sol (SOL-3) was colorless transparent, and was stable for 10 days in a cold and dark place (5° C.)

(4) Preparation of Silica Sol Composition from Precursor (T-4):

2.64 g of a precursor (T-4) was dissolved in 6 g of methanol, to which was added 6 g of aqueous 30% hydrogen peroxide. The resulting mixture was stirred at room temperature for 24 hours, and then subjected to NMR, which confirmed the absence of —SH from the precursor (T-4) and the presence of —SO$_3$H in the thus-processed compound. Thus prepared, the sol (SOL-4) was colorless transparent, and was stable for 6 days in a cold and dark place (5° C.).

(5) Preparation of Silica Sol Composition from Precursor (T-2):

2.36 g of a precursor (T-4) was dissolved in 6 g of methanol, to which was added 6 g of aqueous 30% hydrogen peroxide. The resulting mixture was stirred at room temperature for 24 hours, and then subjected to NMR, which confirmed the absence of —SH from the precursor (T-2) and the presence of —SO$_3$H in the thus-processed compound. Thus prepared, the sol (SOL-5) was colorless transparent, and was stable for 5 days in a cold and dark place (5° C.).

(6) Preparation of Silica Sol Composition from Precursor (T-9):

3.56 g of a precursor (T-9) was dissolved in 10 g of 2-propanol, to which was added 6 g of aqueous 30% hydrogen peroxide. The resulting mixture was stirred at room temperature for 24 hours, and then subjected to NMR, which confirmed the absence of —SH from the precursor (T-9) and the presence of —SO$_3$H in the thus-processed compound. Thus prepared, the sol (SOL-6) was colorless transparent, and was stable for 5 days in a cold and dark place (5° C.).

(7) Preparation of Silica Sol Composition from Precursor (T-20):

3.22 g of a precursor (T-20) was dissolved in 8 g of methanol, to which was added 10 g of aqueous 30% hydrogen peroxide. The resulting mixture was stirred at room temperature for 24 hours, and then subjected to NMR, which confirmed the absence of —SS— from the precursor (T-20) and the presence of —SO$_3$H in the thus-processed compound. Thus prepared, the sol (SOL-7) was colorless transparent, and was stable for 10 days in a cold and dark place (5° C.).

(8) Preparation of Silica Sol Composition from Precursor (T-25):

2.63 g of a precursor (T-25) was dissolved in 6 g of methanol, to which was added 7 g of aqueous 30% hydrogen peroxide. The resulting mixture was stirred at room temperature for 24 hours, and then subjected to NMR, which confirmed the absence of —SS— from the precursor (T-25) and the presence of —SO$_3$H in the thus-processed compound. Thus prepared, the sol (SOL-8) was colorless transparent, and was stable for 6 days in a cold and dark place (5° C.)

(9) Preparation of Silica Sol Composition from Precursor (T-3):

3.22 g of a precursor (T-3) was dissolved in 6 g of aqueous 20% ethanol, to which was added 38 g of 9% peracetic acid solution. The resulting mixture was stirred at room temperature for 24 hours, and then subjected to NMR, which confirmed the absence of —SH from the precursor (T-3) and the presence of —SO$_3$H in the thus-processed compound. Thus prepared, the sol (SOL-9) was colorless transparent, and was stable for 10 days in a cold and dark place (5° C.).

(10) Preparation of Silica Sol Composition from Precursors (T-3) and (T-4):

3.22 g of a precursor (T-3) and 2.64 g of a precursor (T-4) were dissolved in 15 g of methanol, to which was added 10 g of aqueous 30% hydrogen peroxide. The resulting mixture was stirred at room temperature for 24 hours, and then subjected to NMR, which confirmed the absence of —SH from the precursors (T-3) and (T-4) and the presence of —SO$_3$H in the thus-processed compound. Thus prepared, the sol (SOL-10) was colorless transparent, and was stable for 8 days in a cold and dark place (5° C.).

(11) Preparation of Silica Sol from Precursor (T-29) Alone

Comparative Example 1

1.96 g of a precursor (T-29) was dissolved in 10.3 g of methanol, to which was added 5 g of aqueous 30% hydrogen peroxide. The resulting mixture was stirred at room temperature for 1 hour, whereupon it gave a solid precipitate not giving a stable sol.

(12) Preparation of Silica Sol from Precursor (T-30) Alone

Comparative Example 2

1.8 g of a precursor (T-30) was dissolved in 10.3 g of methanol, to which was added 5 g of aqueous 30% hydrogen peroxide. The resulting mixture was stirred at room temperature for 30 minutes, whereupon it gave a solid precipitate not giving a stable sol.

(13) Preparation of Silica Sol from Precursors (T-29) and (T-30)

Comparative Example 3

1.96 g of a precursor (T-29) and 1.8 g of a precursor (T-30) were dissolved in 20.6 g of methanol, to which was added 10 g of aqueous 30% hydrogen peroxide. The resulting mixture was stirred at room temperature for 10 minutes, whereupon it gave a solid precipitate not giving a stable sol.

(Conclusion)

As in the above, the silica sol compositions of the invention are all extremely stable, almost neither gelling nor giving a solid precipitate while stored, as compared with the silica sol composition of Comparative Examples.

Example 2

Organosilicon compounds S-1, S-10 and S-13 were produced according to the reaction schemes 1 to 3 mentioned below.

(1) Production of S-1:

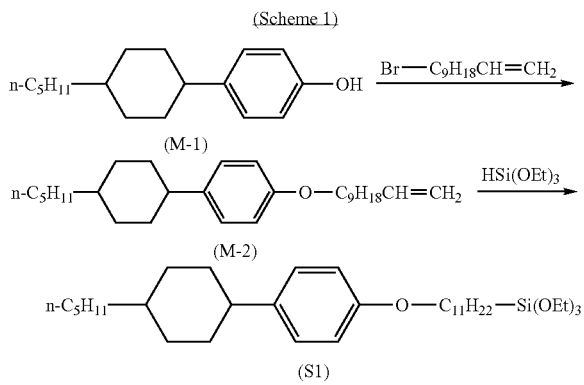

(1-1) Production of Intermediate M-2:

P-(trans-4-pentylcyclohexyl)phenol (M-1, by Kanto Chemical) (24.6 g, 100 mmols) was dissolved in 100 ml of DMF, and 25 g of potassium carbonate was added thereto. With stirring under heat at 80° C., 11-bromo-1-undecene (24.5 g, 105 mmols) was dropwise added thereto over a period of 10 minutes. Further stirred under heat for 3 hours, the reaction mixture was poured into 300 ml of water, and the crystal formed was collected. The crude crystal thus obtained was recrystallized from methanol, and 36.4 g of M-2 was obtained.

(1-2) Production of S-1:

The intermediate M-2 (3.99 g, 10 mmols) and triethoxysilane (1.8 g, 11 mmols) were dissolved in toluene in a reactor, which was then purged with nitrogen. The reaction liquid was kept at 80° C., and chloroauric acid (5 mg) was added thereto and heated for 3 hours. The reaction mixture was concentrated and purified through silica gel column chromatography to obtain 1.1 g of S-1 (colorless oil).

(2) Production of S-10:

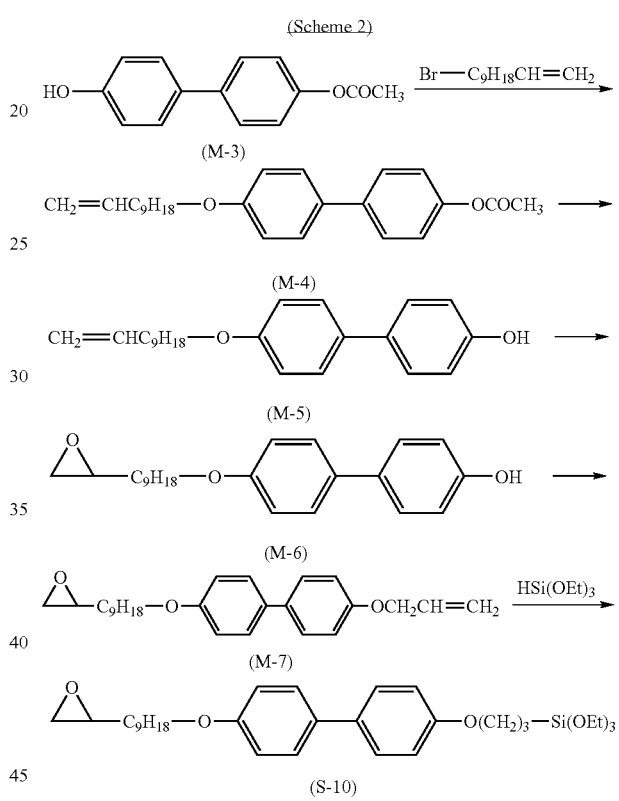

(2-1) Production of Intermediate M-5:

4,4'-Dihydroxy-biphenylmonoacetylate (M-3) (45.6 g, 200 mmols) was dissolved in 1000 ml of DMF, to which was added 20 g of potassium carbonate. To it, 11-bromo-1-undecene (47.2 g, 200 mols) was dropwise added. The reaction liquid was heated at 80° C. for 5 hours, then cooled to room temperature, and poured into water. The crystal thus precipitated was collected. The crude crystal was washed with hot methanol, and dried to obtain 72 g of M-4. M-4 (50.8 g, 133.5 mmols) was dispersed in 100 ml of methanol, to which was added aqueous potassium hydroxide solution (KOH 12 g/water 10 ml). This was heated at 40° C. for 1 hour and then at 80° C. for 20 minutes. The reaction liquid was poured into water, and the crystal thus precipitated was taken out through filtration. This was washed with hot methanol and dried to obtain 44 g of M-5.

(2-2) Production of Intermediate M-7:

M-5 (20.3 g, 60 mmols) was dissolved in 400 ml of methylene chloride, to which was added 120 ml of aqueous 0.5 M sodium hydrogencarbonate solution. With stirring, m-chloroperbenzoic acid (purity 69%, 16.5 g, 66 mmols) was added to it over a period of 10 minutes. This was further stirred for 7 hours, and water and a small amount of sodium hydrogen sulfite were added to the reaction liquid. Then, this was washed with water, and methylene chloride was evaporated away to obtain a crude crystal. The crude crystal was washed with hot acetonitrile to obtain 12 g of M-6. M-6 (11 g, 31 mmols) was dissolved in 50 ml of dimethylformamide, to which was added 10 g of potassium carbonate. With stirring, allyl iodide (5.2 g, 31 mmols) was dropwise added thereto. This was further stirred at room temperature for 2 hours, and then at 50° C. for 1 hour. The reaction liquid was poured into water, and the crystal precipitated was recrystallized from methanol to obtain 12.1 g of M-7.

(2-3) Production of S-10:

M-7 (5 g, 12.7 mmols) and triethoxysilane (3.13 g, 19.05 mmols) were dissolved in 50 ml of toluene, to which was added 10 mg of chloroauric acid in a nitrogen atmosphere at 80° C. The reaction liquid was kept at 80 to 90° C. for 1 hour to react the compounds, and the solvent was evaporated away. The residue was purified through silica gel column chromatography to obtain 3.2 g of S-10.

(3) Production of S-13:

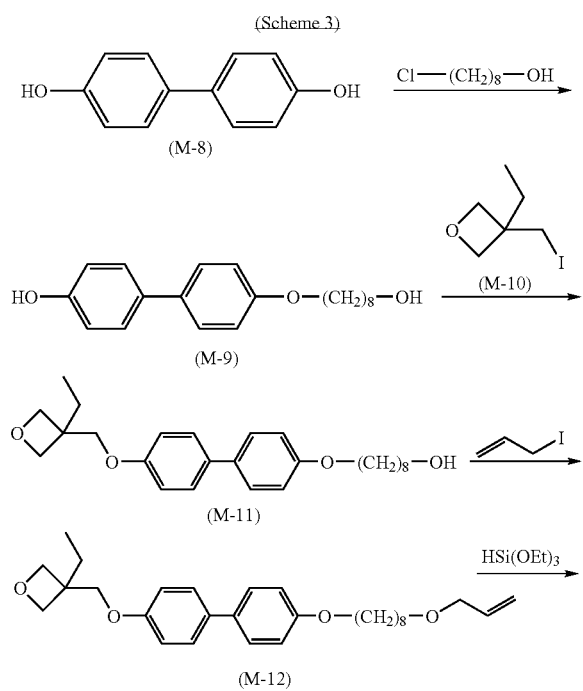

-continued

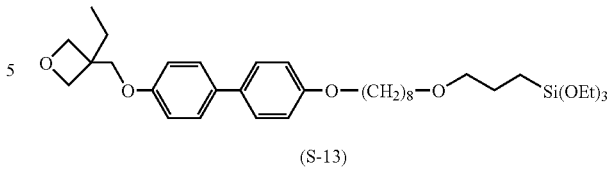

(S-13)

(3-1) Production of Intermediate M-11:

4,4'-Dihydroxybiphenyl M-8 (76.2 g, 410 mmols) was dissolved in 400 ml of dimethylacetamide, to which were added potassium carbonate (42.2 g) and potassium iodide (24.1 g), and then 8-Chloroctanol (47.2 g, 287 mmols). The reaction liquid was stirred at 110° C. for 5 hours, and then cooled to room temperature. Then, this was poured into water, and the crystal precipitated was taken out through filtration. The resulting crude crystal was recrystallized from acetonitrile to obtain 63.8 g of M-9. Thus obtained, M-9 (10 g. 31.8 mmols) was dissolved in 40 ml of dimethylacetamide, to which was added potassium carbonate (3.3 g). With stirring at 50° C., an iodide M-10 (7.42 g, 35 mmols) was dropwise added thereto. This was reacted at 80° C. for 3 hours, and the reaction mixture was poured into water. The resulting crude crystal was recrystallized twice from acetonitrile to obtain 11.7 g of M-11.

(3-2) Production of Intermediate M-12:

M-11 (10 g, 24.2 mmols) was dissolved in dewatered tetrahydrofuran, and heated at 60° C. With stirring, sodium hydride (60% in oil) (1.2 g, 30 mmols) was added to it little by little, and this was foamed. After its foaming was stopped, allyl iodide (5.4 g, 32.2 mmols) was dropwise added thereto over a period of 5 minutes. The reaction mixture was stirred at 60° C. for 3 hours, then poured into water, extracted with ethylacetate, and purified through column chromatography to obtain 10.6 g of M-12 (white solid).

(3-3) Production of S-13:

M-12 (10 g, 22 mmols) and triethoxysilane (10.9 g, 66 mmols) were dissolved in 50 ml of toluene, and a solution of 100 mg of chloroauric acid dissolved in 3 ml of benzonitrile was dropwise added to it in a nitrogen atmosphere at 80° C. The reaction liquid was kept at 80 to 90° C. for 30 minutes to react the compounds therein, and the reaction mixture was concentrated and purified through silica gel column chromatography to obtain 5.2 g of S-13 (colorless viscous liquid).

(4) Production of S-25:

Organosilicon compounds S-24 was produced according to the reaction scheme 4 shown below.

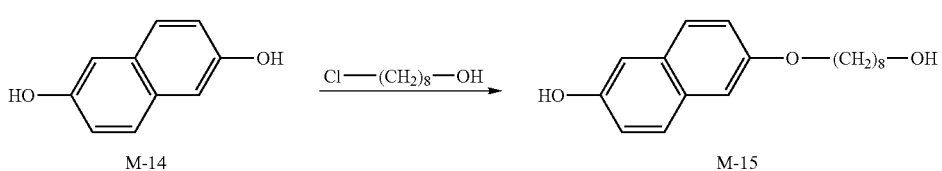
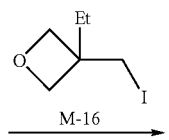

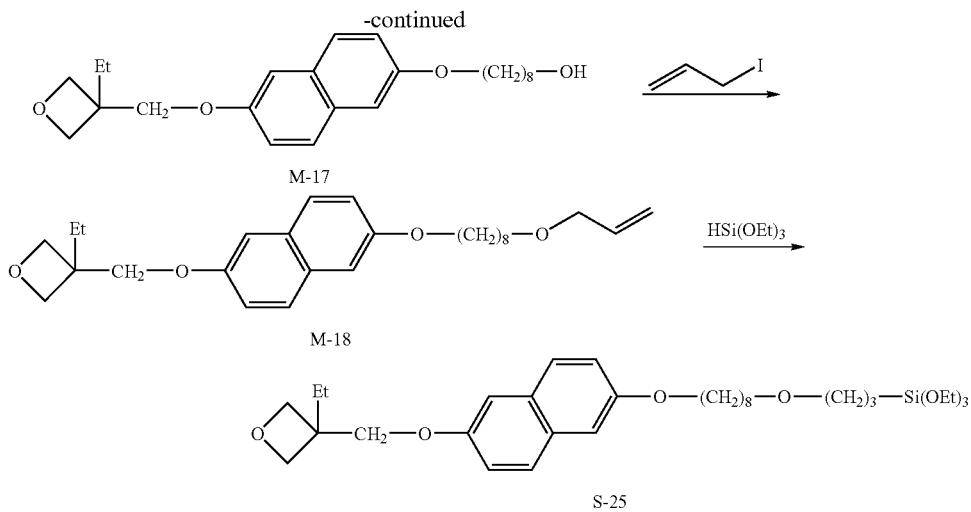

(4-1) Production of Intermediate M-4:

4,4'-Dihydroxynaphthalene M-14 (23.5 g, 143 mmols) was dissolved in 8 ml of dimethylacetamide, to which were added potassium carbonate (11.1 g, 80 mmols) and potassium iodide (6.7 g), and then 8-chlorooctanol (71.8 g, 72 mmols). The reaction liquid was stirred at 110° C. for 9 hours, and then cooled to room temperature. Then, this was poured into water, and the crystal precipitated was taken out through filtration. The resulting crude crystal was recrystallized from acetonitrile to obtain 16.3 g of M-15. Thus obtained, M-15 (10 g. 34.7 mmols) was dissolved in 40 ml of dimethylacetamide, to which was added potassium carbonate (9.6 g). With stirring at 50° C., an iodide M-16 (9.4 g, 41.6 mmols) was dropwise added thereto. This was reacted at 100° C. for 4 hours, and the reaction mixture was poured into water. The resulting crude crystal was recrystallized from acetonitrile to obtain 4.2 g of M-17.

(4-2) Production of Intermediate M-5:

M-17 (3.6 g, 9.4 mmols) was dissolved in dewatered tetrahydrofuran, and heated at 60° C. With stirring, sodium hydride (60% in oil) (0.5 g, 12.2 mmols) was added to it little by little, and this was foamed. After its foaming was stopped, allyl iodide (2.4 g, 14.1 mmols) was dropwise added thereto. The reaction mixture was stirred at 60° C. for 3 hours, then poured into water, extracted with ethyl acetate, and purified through column chromatography to obtain 2.1 g of M-18.

(4-3) Production of S-25:

M-18 (1.5 g, 3.4 mmols) and triethoxysilane (2.4 g, 14.3 mmols) were dissolved in 10 ml of toluene, and a solution of 100 mg of chloroauric acid dissolved in 0.5 ml of benzonitrile was dropwise added to it in a nitrogen atmosphere at 80° C. The reaction liquid was kept at 80° C. for 1 hour to react the compounds therein, and the reaction mixture was concentrated and purified through silica gel column chromatography to obtain 0.76 g of S-25.

(5) Production of S-26:

Organosilicon compounds S-26 was produced according to the reaction scheme 5 shown below.

(Scheme 5)

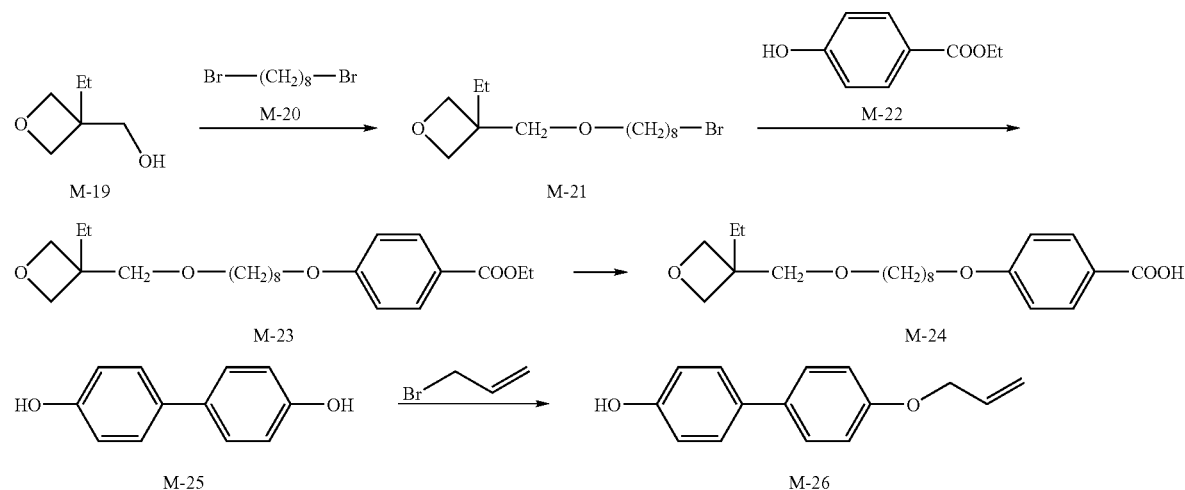

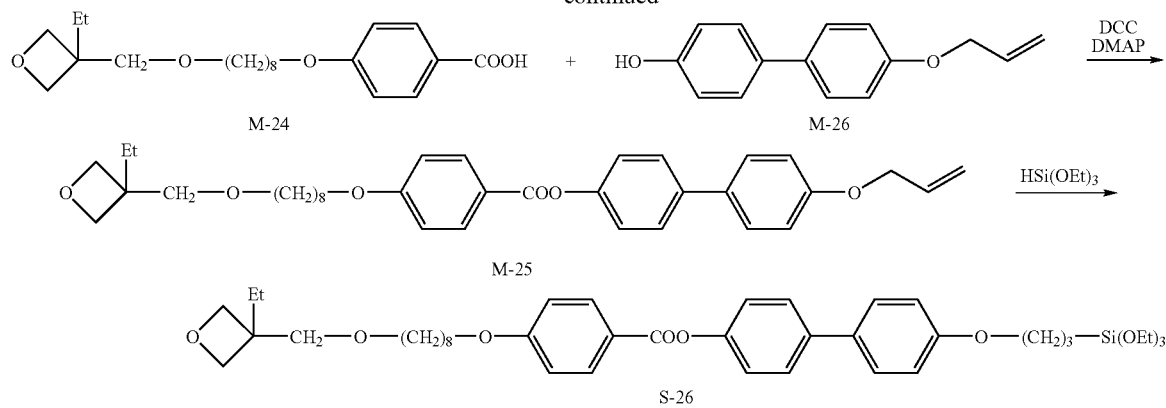

(5-1) Production of Intermediate M-24:

Tetrabutylammonium bromide (3.0 g) was dissolved in 50% aqueous solution of sodium hydroxide and 3-ethyl-3-oxetanemethanol M-19 (19 g, 0.16 mmols) and 1,8-dibromooctane M-20 (136 g, 0.5 mols) were added thereto. The reaction liquid was stirred under reflux with heating for 3.5 hours and cooled with ice. Water (600 ml) was added to the reaction liquid and the resultant mixture was extracted with ethyl acetate. Excess bromide M-20 was removed by vacuum distillation and purification was conducted through column chromatography to obtain 36 g of M-21. Thus obtained M-21 (33 g, 0.107 mols) was dissolved in dimethyl acetoamide (120 ml), to which was added ethyl 4-hydroxybenzoate M-22 (17 g, 0.102 mols) and potassium carbonate (23 g). The reaction mixture was stirred at 80° C. for 8 hours, poured into water, extracted with ethyl acetate and purified through column chromatography to obtain 35 g of M-23. Thus obtained M-23 (35.4 g, 90.2 mmols) was dissolved in ethanol (60 ml), to which sodium hydroxide (7.2 g, 180 mmols) and water (20ml) were added. The reaction mixture was stirred at 60° C. for 3 hours, neutralized with concentrated hydrochloric acid (15.4 ml, 85.8 ml/mol), extracted with ethyl acetate and purified through column chromatography to obtain 33 g of M-24.

(5-2) Production of Intermediate M-26:

Dihydroxybiphenyl M-25 (25 g, 134 mmols) was dissolved in acetone (100 ml), to which potassium carbonate (20 g, 145 mmols) was added. With stirring at 60° C., a solution of allyl bromide (16.2 g, 134 mmols) in acetone (100 ml) was dropwise added thereto. After stirring at 60° C. for 7 hours, precipitated salts were removed through filtration and water, dilute hydrochloric acid and sodium chloride were added to the filtrate. The mixture was extracted with ethyl acetate and concentrated to obtain a crude crystal, which was recrystallized from ethanol to obtain 6 g of M-26.

(5-3) Production of Intermediate M-27:

M-24 (10. 5 g, 31.2 mmols) was dissolved in chloroform (100 ml), to which were added M-26 (6.4 g, 28.4 mmols) and dimethylaminopyridine (5.2 g, 42.6 mmols). The reaction liquid was cooled to 0° C. A solution of dicyclohexylcarbodiimide (5.8 g, 45.4 mmols) in chloroform (20 ml) was dropwise added thereto and the reaction liquid was stirred at 0° C. for 1 hour. Precipitated salts were removed through filtration, concentrated and purified through column chromatography to obtain 11.9 g of M-27.

(5-4) Production of S-26:

M-27 (5.7 g, 10 mmols) and triethoxysilane (5.0 g, 30 mmols) were dissolved in toluene (25 ml), and a solution of 17 mg of chloroauric acid dissolved in 0.5 ml of benzonitrile was dropwise added thereto in a nitrogen atmosphere. The reaction liquid was kept at it at 80° C. for 1 hour to react the compounds therein, and the reaction mixture was concentrated and purified through silica gel column chromatography to obtain 3.2 g of S-26.

Example 3

(1) Formation of Proton-exchange Membrane (E-1):

1. Formation of Proton-exchange Membranes:

T-3 (1.94 g) was dissolved in methanol (6.2 g), to which was added aqueous 30% hydrogen peroxide (2 g). The resulting mixture was stirred at room temperature for 24 hours and then subjected to NMR, which confirmed the absence of —SH from T-3 and the presence of —SO$_3$H in the thus-processed compound. Thus prepared, the sol (SOL-1) was colorless transparent, and was stable for 5 days while kept in a cold and dark place (5° C.).

SOL-1 (1.1 g) and xylene (0.2 ml) were added to a solution of S-13 (0.4 g) dissolved in 2,2,3,3-tetrafluoro-1-propanol (1.2 ml), and stirred under heat at 50° C. for 3 hours. The resulting mixture was cast over a polyimide film (Upilex-75S by Ube Kosan), and dried at room temperature for 24 hours. Thus solidified, this was peeled away from the polyimide film to obtain a white membrane having a thickness of 110 μm. Through observation with a polarizing microscope, anisotropic fine domains were found in the membrane. This confirms that the membrane is formed of aggregates of the mesogen of S-13 integrated and oriented in one direction.

(2) Formation of Proton-exchange Membrane (E-2):

T-1 (1.0 g) was dissolved in methanol (2.4 g), to which was added aqueous 30% hydrogen peroxide (1.2 g). The resulting mixture was stirred at room temperature for 24 hours and then subjected to NMR, which confirmed the absence of —SH from T-1 and the presence of —SO$_3$H in the thus-processed compound. Thus prepared, the sol (SOL-2) was colorless transparent, and was stable for 3 days while kept in a cold and dark place (5° C.).

SOL-2 (0.86 g) and xylene (0.2ml) were added to a solution of precursor S-21 (0.455 g) dissolved in isopropanol (1 ml), and stirred under heat at 50° C. for 2 hours. The resulting mixture was cast over a polyimide film (Upilex- 75S by Ube Kosan), and dried at room temperature for 24 hours. Thus solidified, this was peeled away from the polyimide film to obtain a white membrane having a thickness of 115 μm. Through observation with a polarizing microscope, an isotropic fine domains were found in the membrane. This confirms that the membrane is formed of aggregates of the mesogen of S-21 integrated and oriented in one direction.

(3) Formation of Proton-exchange Membrane (E-3):

A milky white membrane (E-3) having a thickness of 108 μm was formed in the same manner as in (2), for which, however, a mixture of precursor S-21 (0.274 g) and precursor S-23 (0.181 g) was used in place of precursor S-21 (0.455 g).

(4) Formation of Proton-exchange Membrane (E-4):

T-4 (1.6 g) was dissolved in methanol (4.7 g), to which was added aqueous 30% hydrogen peroxide (2.05 g). The resulting mixture was stirred at room temperature for 24 hours and then subjected to NMR, which confirmed the absence of —SH from T-4 and the presence of —$SO_3H$ in the thus-processed compound. Thus prepared, the sol (SOL-3) was colorless transparent, and was stable for 5 days while kept in a cold and dark place (5° C.).

A milky white membrane (E-4) having a thickness of 112 μm was formed in the same manner as in (2), for which, however, SOL-3 (0.90 g) was used in place of SOL-2 (0.86 g).

(5) Formation of Proton-exchange Membrane (E-5):

A milky white membrane (E-5) having a thickness of 108 μm was formed in the same manner as in (1), for which, however, a mixture of SOL-1 (0.5 g) and SOL-3 (0.5 g) was used in place of SOL-1 (1.1 g).

(6) Formation of Proton-exchange Membrane (E-6):

T-3 (0.097 g) and S-13 (0.185 g) were dissolved in xylene (0.3 ml)/isopropanol (1.0 ml), to which was added aqueous 30% hydrogen peroxide (0.204 ml). The resulting mixture was stirred under heat at 60° C. for 5 hours. Then, 850 μl of the reaction liquid was cast into a square frame of 3 cm×3 cm of a 180 μm-thick Teplon tape formed on a polyimide film (Upilex #75S by Ube Kosan). This was covered with a lid and left as such while the opening between the frame and the lid was so controlled that the solvent could completely evaporate away from the reaction liquid in the frame over a period of 10 hours. After 20 hours, this was heated at 60° C. for 3 hours. Thus solidified, this was peeled away from the polyimide film, washed with water and dried to obtain a proton-exchange membrane having a thickness of 125 μm.

(7) Proton-exchange Membrane (E-7):

A proton-exchange membrane (E-7) having a thickness of 131 μm was formed in the same manner as that for (E-6), for which, however, a mixture of S-13 (0.176 g) and K-10 (0.0077 mg, 5 mol % relative to S-4) was used in place of S-4 (0.185 g).

(8) Proton-exchange Membrane (E-8):

A proton-exchange membrane (E-8) having a thickness of 128 μm was formed in the same manner as that for (E-7), for which, however, a mixture of S-4 (0.167 g) and K-10 (0.0154 mg, 10 mol % relative to S-4) was used in place of the mixture of S-4 (0.176 g) and K-10 (0.0077 mg, 5 mol % relative to S-4).

(9) Proton-exchange Membrane (E-9):

A proton-exchange membrane (E-9) having a thickness of 130 μm was formed in the same manner as that for (E-6), for which, however, S-26 (0.221 g) was used in place of S-13 (0.185 g).

(10) Proton-exchange Membrane (E-10):

A proton-exchange membrane (E-10) having a thickness of 132 μm was formed in the same manner as that for (E-9), for which, however, a mixture of S-26 (0.199 g) and K-6 (0.0155 mg, 10 mol % relative to S-26) was used in place of S-26 (0.221 g).

(11) Proton-exchange Membrane (E-11):

A proton-exchange membrane (E-11) having a thickness of 122 μm was formed in the same manner as that for (E-10), for which, however, a mixture of S-25 (0.156 mg) and K-10 (0.0185 mg) was used in place of the mixture of S-26 (0.199 g) and K-6 (0.0155 mg, 10 mol % relative to S-26).

(12) Proton-exchange Membrane (E-12):

T-3 (0.145 g) and S-31 (0.199 g) were dissolved in xylene (0.3 ml)/isopropanol (1.0 ml), to which was added aqueous 30% hydrogen peroxide (0.204ml). The resulting mixture was stirred under heat at 50° C. for 20 minutes. Then, 850 μl of the reaction liquid was cast into a square frame of 3 cm×3 cm of a 180 μm-thick Teplon tape formed on a polyimide film (Upilex #75S by Ube Kosan). This was covered with a lid and left as such while the opening between the frame and the lid was so controlled that the solvent could completely evaporate away from the reaction liquid in the frame over a period of 10 hours. After 20 hours, this was heated at 60° C. for 3 hours. Thus solidified, this was peeled away from the polyimide film, washed with water and dried to obtain a proton-exchange membrane having a thickness of 124 μm.

(13) Proton-exchange Membrane (E-13):

A proton-exchange membrane having a thickness of 123 μm was formed in the same manner as that for (E-12), for which, however, a mixture of S-31 (0.179 g) and K-18 (0.015 g) was used in place of S-31 (0.199 g).

(14) Formation of Proton-exchange Membrane (R-1):

(X-11) (800 mg) and TEOS (200 mg) were dissolved in ethanol, to which was added 50 μl of aqueous 2% hydrochloric acid at 25° C., and stirred for 20 minutes. An isopropanol solution of phosphoric acid (phosphoric acid ($H_3PO_4$, 500 mg)/isopropanol 1 ml) was added to the resulting solution and stirred at 25° C. for 30 minutes, and this was applied onto a Teflon sheet with an applicator. This was left at room temperature for 2 hours, and heated at 50° C. for 2 hours and then at 80° C. for 3 hours. This was peeled away from the Teflon sheet to obtain a comparative transparent solid sheet (R-1) having a thickness of 85 μm.

(15) Formation of Proton-exchange Membrane (E-14):

A transparent membrane (E-14) having a thickness of 110 μm was formed in the same manner as in (1) for forming the proton-exchange membrane (E-1), for which, however, an aqueous 33% solution of (T-31) was used in place of SOL-1.

2. Resistance to Aqueous Methanol Solution:

Circular discs having a diameter of 13 mm were blanked out of the thus-obtained proton-exchange membranes (E-1 to E-14), comparative proton-exchange membrane (R-1) and Nafion 117 (by DuPont), and each of these samples was dipped in 5 ml of an aqueous 10 mas. % methanol solution for 48 hours. The proton-exchange membranes (E-1 to E-14) of the invention swelled little, and their shape and strength did not change from those of the non-dipped samples.

However, the comparative sample R-1 cracked. In addition, this released 85% by mass of the theoretical amount of phosphoric acid into the aqueous methanol solution. The Nafion 117 sample swelled by about 70% by mass, and its shape changed. The proton-exchange membranes (E-1 to E-14) of the invention was dipped in an aqueous 64 mas. % methanol solution for 48 hours. The proton-exchange membranes (E-1 to E-6, E-9, E-10, E-12 and E-14) became brittle and cracked. The proton-exchange membranes (E-7, E-8, E-11 and E-13) comprising the compound represented by formula (VIII) of the invention, K-10, K-6 or K-18 showed no change of their shapes and exhibited sufficient resistance to aqueous methanol solution.

These results confirm that the proton-exchange membranes of the invention are satisfactorily resistant to the fuel, aqueous methanol solution in direct methanol fuel cells.

Figure 3:
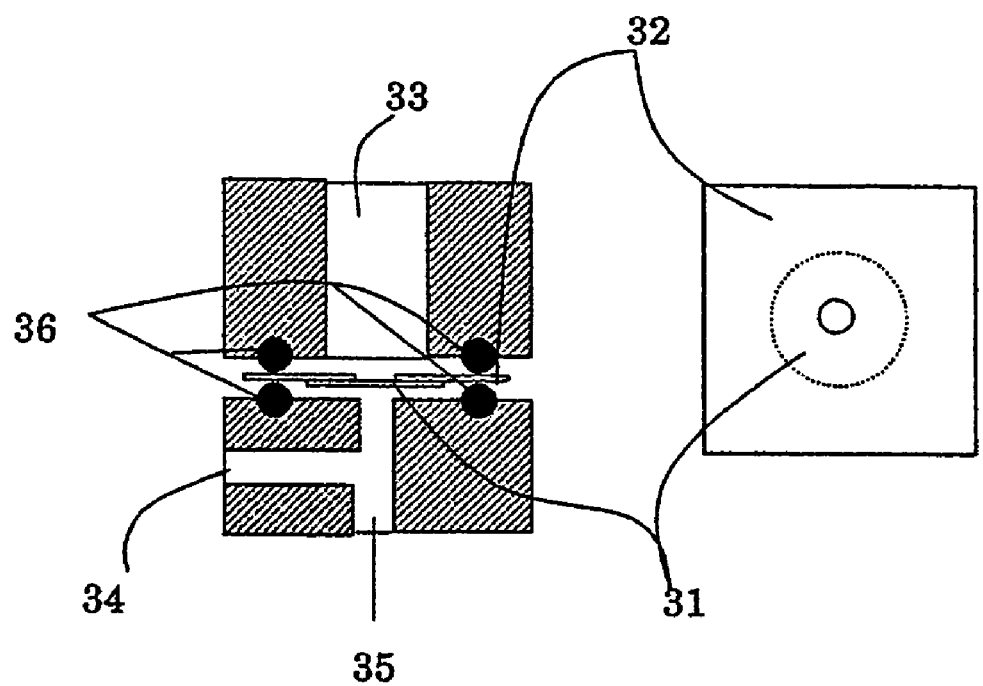
FIG. 3 is a schematic cross-sectional view showing a stainless cell used for determination of methanol perviousness of a proton-exchange membrane.

3. Determination of Methanol Previousness:

Circular discs having a diameter of 13 mm were blanked out of the thus-obtained proton-exchange membranes (E-1, E-6, E-8, E-11) and comparative proton-exchange membranes (R-1, and Nafion 117), and each of these samples was reinforced with a Teplon tape having a circular hole (diameter, 5 mm). The thus-reinforced sample was fitted to a stainless cell as in FIG. 3 wherein 31 denotes a proton-exchange membrane, 32 denotes Teflon (trade name) tape, and 36 denotes rubber packing. The upper part 33 of the cell was filled with aqueous methanol, and hydrogen gas was fed into the lower part 35 of the cell at a constant flow rate, whereupon the quantity of methanol having passed through the membrane was determined by a gas chromatographic detector connected to the lower detection port 34 of the cell. The data are given in Table 1.

TABLE 1

Relative Methanol Perviousness based on the standard value 1, of Nafion 117

| Proton-Exchange Membrane | Methanol Concentration | | | Remarks |
| --- | --- | --- | --- | --- |
| | 4.6 mas % | 18.6 mas % | 46 mas % | |
| R-1 | 0.3 | NG | NG | comparative |
| E-1 | 0.05 | 0.05 | NG | invention |
| E-6 | 0.01 | 0.01 | NG | invention |
| E-8 | 0.01 | 0.02 | 0.02 | invention |
| E-11 | 0.01 | 0.01 | 0.01 | invention |

NG: As the membrane broke, it could not be tested.

(Conclusion)

From Table 1, it is understood that the methanol previousness of the proton-exchange membranes of the invention is lower than 1/50 of that of Nafion 117.

4. Determination of Ionic Conductivity:

Circular discs having a diameter of 13 mm were blanked out of the proton-conductive membranes (E-1) to (E-13) of the invention and the comparative sample (R-1) formed in Example 1, and out of Nafion 117. Sandwiched between two stainless plates, the ionic conductivity of each of these samples was measured at 25° C. and at a relative humidity of 95% according to an AC impedance process. The data are given in Table 2.

TABLE 2

| Proton-Exchange Membrane | Ionic Conductivity ×10$^{-3}$ S/cm | Remarks |
| --- | --- | --- |
| E-1 | 0.61 | invention |
| E-2 | 0.46 | invention |
| E-3 | 0.56 | invention |
| E-4 | 0.42 | invention |
| E-5 | 0.38 | invention |
| E-6 | 0.98 | invention |
| E-7 | 1.1 | invention |
| E-8 | 1.4 | invention |
| E-9 | 0.86 | invention |
| E-10 | 1.2 | invention |
| E-11 | 2.1 | invention |
| E-12 | 0.76 | invention |
| E-13 | 1.4 | invention |
| R-1 | 0.11 | comparative |
| Nafion 117 | 6.8 | comparative |

(Conclusion)

It is understood that, though not comparable to Nafion 117, the proton-exchange membranes of the invention have a higher ionic conductivity than the comparative hybrid membrane (R-1) of no optical anisotropy. When (E-6) is compared with (E-7) and (E-8), (E-9) is with (E-10), and (E-12) is with (E-13), then it is understood that the membranes containing a compound of formula (VIII) (K-10, K-6, K-18) of the invention have a higher ionic conductivity.

Example 4

(1) Formation of Catalyst Membrane:

2 g of platinum-carrying carbon (Vulcan XC72 with 50 wt. % platinum) was mixed with 15 g of a Nafion solution (5% alcoholic aqueous solution), and dispersed for 30 minutes with an ultrasonic disperser. The mean particle size of the resulting dispersion was about 500 nm. The dispersion was applied onto carbon paper (having a thickness of 350 μm) and dried, and a circular disc having a diameter of 9 mm was blanked out of it.

(2) Fabrication of MEA:

The catalyst membrane prepared in (1) was attached to both surfaces of the proton-exchange membrane (E-1, E-2, E-3 and E-8) formed in Example 1 and Nafion 117 in such a manner that the dispersion-coated face of the catalyst membrane could be contacted with the proton-exchange membrane, and hot-pressed at 80° C. under 3 MPa for 2 minutes to fabricate MEA-1 to MEA-5.

(3) Fuel Cell Properties:

The MEA fabricated in (2) was set in a fuel cell as in FIG. 2, and an aqueous 50 mas. % methanol solution was to the cell via the anode-side opening 15. In this condition, the cathode-side opening 16 was kept in contact with air. Using a galvanostat, a constant current of 5 mA/cm$^2$ was applied between the anode 12 and the cathode 13, and the cell voltage was measured in this stage. The data are given in Table 3.

TABLE 3

| Proton-Exchange Membrane | MEA | Cell C | Time-Dependent Change of Terminal Voltage (V) | | | Remarks |
|---|---|---|---|---|---|---|
| | | | initial | after 0.2 hrs | after 0.5 hrs | |
| E-1 | 1 | 1 | 0.69 | 0.55 | 0.55 | invention |
| E-2 | 2 | 2 | 0.68 | 0.60 | 0.59 | invention |
| E-3 | 3 | 3 | 0.65 | 0.62 | 0.61 | invention |
| E-8 | 4 | 4 | 0.70 | 0.65 | 0.65 | invention |
| Nafion 117 | 5 | 5 | 0.68 | 0.42 | 0.38 | comparative |

Figure 4:
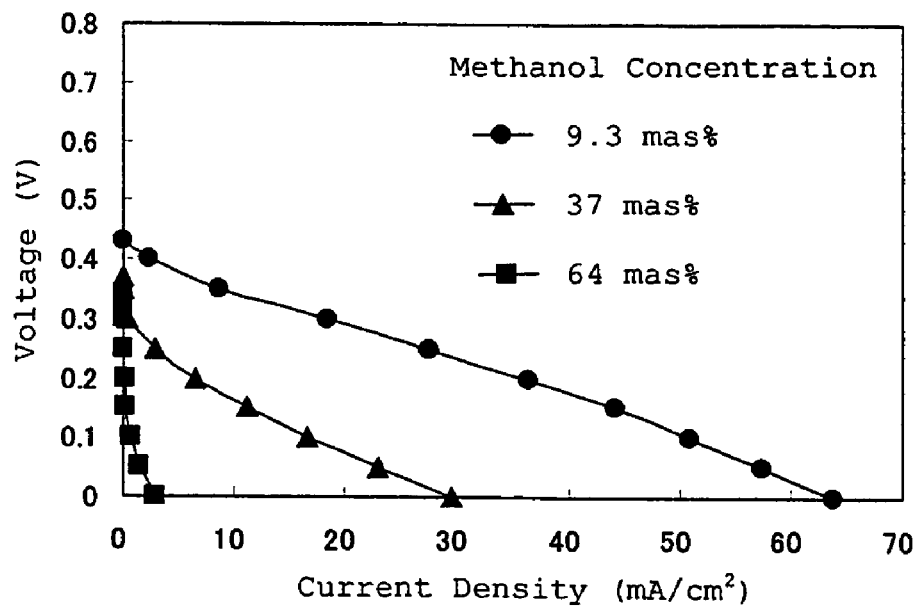
FIG. 4a and FIG. 4b show the current-voltage curve of the cell C-4 of the invention and that of the comparative cell C-5, respectively.
Figure 4:
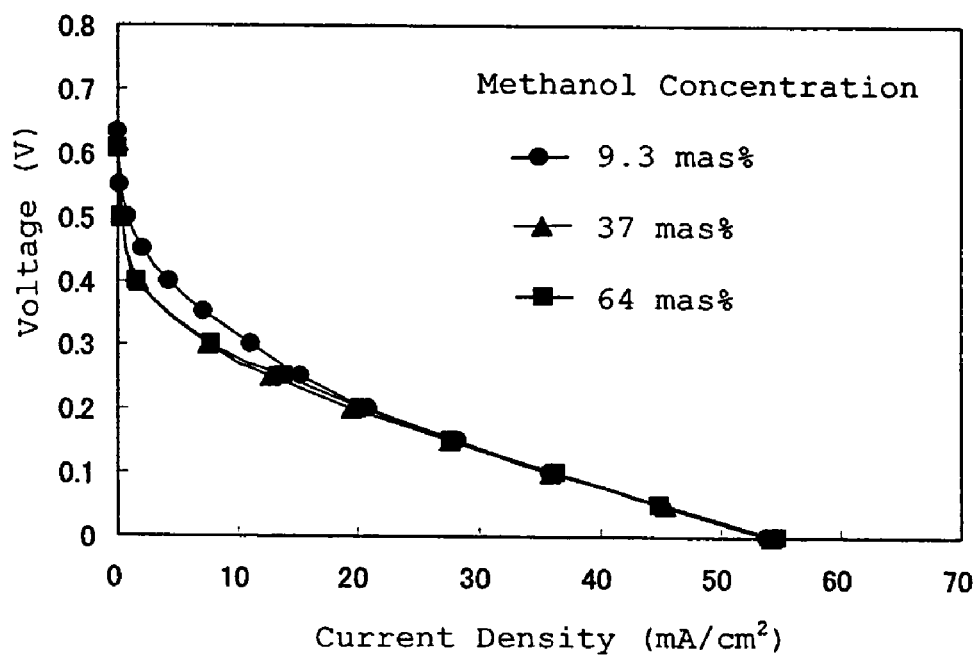

FIG. 4a and FIG. 4b show the current-voltage curve of the cell C-4 of the invention and that of the comparative cell C-5, respectively.

(Conclusion)

As in Table 3, it is understood that the initial voltage of the cell C-5 having a Nafion membrane 117 therein was high, but the voltage of the cell decreased in time. However, the voltage of the cells C-1 to C-4 having the proton-exchange membrane of the invention was stable. From FIG. 4a and FIG. 4b, it is understood that the output depression at high methanol concentration was noticeable in the comparative cell C-5, but the methanol concentration dependence of the cell C-4 of the invention is extremely small. Even at a high methanol concentration (64% by mass), the cell C-4 exhibited satisfactory power generation.

The time-dependent voltage depression and the methanol concentration dependence of the voltage-current curve of the cells are caused by the methanol-crossover phenomenon known in the art, or that is, by the leakage of the fuel methanol applied to the side of the anode through the Nafion membrane toward the side of the cathode. The above data confirm the absence of methanol crossover in the cells of the invention.

In the invention, precursors are hydrolyzed and polycondensed in the presence of water and an oxidizing agent, and extremely stable silica sol compositions can be obtained. In addition, the proton-exchange membrane of the invention has a structure of mesogen-containing organic molecular chains and a proton-donating group covalent-bonding to a silicon-oxygen three-dimensional crosslinked matrix, in which at least a part of the organic molecular chains are oriented to form an aggregate thereof. Therefore, its ionic conductivity at room temperature is high, and its resistance to aqueous methanol solution is high to reduce methanol crossover in cells. Accordingly, when used in direct methanol fuel cells, it enables higher output power from the cells than conventional proton-exchange membranes.

The present disclosure relates to the subject matter contained in Japanese Patent Application No. 082369/2003 filed Mar. 25, 2003, Japanese Patent Application No. 082370/2003 filed Mar. 25, 2003 and Japanese Patent Application No. 432663/2003 filed Dec. 26, 2003, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A proton-exchange membrane having a structure of mesogen-containing organic molecular chains and a proton-donating group-containing group covalent-bonding to a silicon-oxygen three-dimensional crosslinked matrix, in which at least a part of the organic molecular chains are oriented to form an aggregate thereof, and a sulfonic acid sol is used, the sulfonic acid sol being obtained through oxidization of a solution that contains an organosilicon compound of the following formula (IV), and an organosilicon compound of the following formula (VI) and/or (VII):

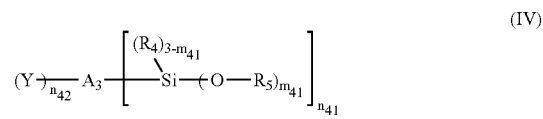

wherein $A_3$ represents the following formula (XIII):

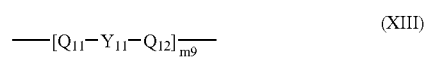

wherein $Q_{11}$ and $Q_{12}$ each represent a divalent linking group or a single bond; $Y_{11}$ is a divalent, 4- to 7-membered ring residue, or a condensed ring residue composed of such rings; and m9 indicates an integer of from 1 to 3; $R_4$ represents an alkyl group, an aryl group or a heterocyclic group; $R_5$ represents a hydrogen atom, an alkyl group, an aryl group or a silyl group; Y represents a polymerizing group capable of forming a carbon-carbon bond or a carbon-oxygen bond through polymerization; $m_{41}$ indicates an integer of from 1 to 3; $n_{41}$ indicates 1 or 2; $n_{42}$ indicates 0 or 1; when $m_{41}$ is 2 or more, $R_5$ may be the same or different,

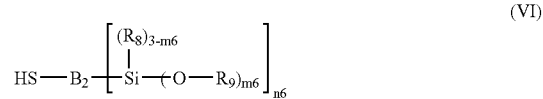

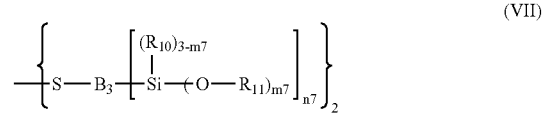

wherein $B_2$ and $B_3$ each represent a linking group that contains an aliphatic group and/or an aromatic group; $R_8$ and $R_{10}$ each represent an alkyl group or an aryl group; m6 and m7 each indicate a integer of from 1 to 3; n6 and n7 each indicate an integer from 1 to 4; $R_9$ and $R_{11}$ each represent a hydrogen atom, an alkyl group, an aryl group or a silyl group; when m6 or m7 is 2 or more, $R_9$ or $R_{11}$ may be the same or different.

2. The proton-exchange membrane of claim 1, in which the organosilicon compound of formula (IV) and/or (VI) is obtained through hydrolysis and polycondensation of a precursor of the following formula (XX) in the presence of water and an oxidizing agent:

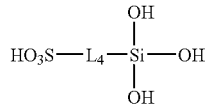
(XX)

wherein $L_4$ represents a divalent linking group.

3. A membrane electrode assembly comprising the proton-exchange membrane of claim 1.

4. A fuel cell comprising the proton-exchange membrane of claim 1.

5. The proton-exchange membrane according to claim 1, wherein $Q_{11}$ and $Q_{12}$ each represent —CH=CH—, —CH=N—, —N=N—, —N(O)=N—, —COO—, —COS—, —CONH—, —COCH$_2$—, —CH$_2$CH$_2$—, —OCH$_2$—, —CH$_2$NH—, —CH$_2$—, —CO—, —O—, —S—, —NH—, —(CH$_2$)$_{(1\ to\ 3)}$—, —CH=CH—COO—, —CH=CH—CO—, —(C≡C)$_{(1\ to\ 3)}$—, or their combination, more preferably —H$_2$—, —CO—, —O—, —CH=CH—, —CH=N—, —N=N—, or their combination.

6. The proton-exchange membrane according to claim 1, wherein $Y_{11}$ represent a 6-membered aromatic group, a 4- to 6-membered saturated or unsaturated aliphatic group, a 5- or 6-membered heterocyclic group, or their condensed ring.

7. The proton-exchange membrane according to claim 1, wherein $B_2$ and $B_3$ each represent —CH=CH—, —CH=N—, —N=N—, —N(O)=N—, —COO—, —COS—, —CONH—, —COCH$_2$—, —CH$_2$CH$_2$—, —OCH$_2$—, —CH$_2$NH—, —CH$_2$—, —CO—, —O—, —S—, —NH—, —(CH$_2$)$_{(1\ to\ 3)}$—, —CH=CH—COO—, —CH=CH—CO—, —(C≡C)$_{(1\ to\ 3)}$—, or their combination.

8. The proton-exchange membrane of claim 1, which is obtained through sol-gel reaction of the compound of formula (IV) with from 1 mol % to 50 mol % of a compound of the following formula (VIII):

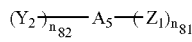

wherein $A_5$ represents a mesogen-containing organic atomic group; $Z_1$ represents a substituent not changing in sol-gel reaction, or a hydrogen atom; $n_{81}$ indicates an integer of from 1 to 8; $n_{82}$ indicates an integer of from 0 to 4; $Y_2$ represents a polymerizing group capable of forming a carbon-carbon bond or a carbon-oxygen bond through polymerization; when $n_{81}$ is 2 or more, $Z_1$ may be the same or different.

9. The proton-exchange membrane of claim 1, in which the organosilicon compound of formula (VI) and/or (VII) is obtained through hydrolysis and polycondensation of a precursor of the following formula (X) and/or (XI) in the presence of water and an oxidizing agent:

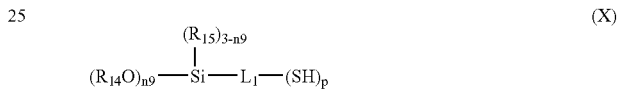
(X)

wherein $L_1$ represents a (p+1)-valent linking group; $R_{14}$ and $R_{15}$ each represent an alkyl group or an aryl group; n9 indicates 2 or 3; at least one $R_{14}$ is an alkyl or aryl group having at least 3 carbon atoms; $R_{14}$'s may be the same or different; and p indicates an integer of from 1 to 3,

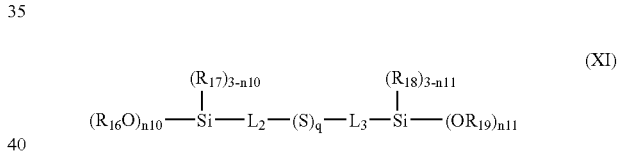
(XI)

wherein $L_2$ and $L_3$ each represent a divalent linking group, $R_{16}$ to $R_{19}$ each represent an alkyl group or an aryl group; n10 and n11 each indicate 2 or 3; at least one $R_{16}$ and at least one R19 each are an alkyl or aryl group having at least 3 carbon atoms; $R_{16}$ and $R_{19}$ each may be the same or different; and q indicates an integer of from 2 to 4.

\* \* \* \* \*